(12) United States Patent
Nishikawa et al.

(10) Patent No.: US 7,597,259 B2
(45) Date of Patent: Oct. 6, 2009

(54) SIM READER/WRITER AND CELLULAR PHONE

(75) Inventors: Seiichi Nishikawa, Shinjuku-Ku (JP); Takashi Haginiwa, Shinjuku-Ku (JP); Hiroo Saitou, Shinjuku-Ku (JP); Naohisa Suzuki, Shinjuku-Ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 268 days.

(21) Appl. No.: 10/546,839

(22) PCT Filed: Feb. 25, 2004

(86) PCT No.: PCT/JP2004/002207

§ 371 (c)(1),
(2), (4) Date: Aug. 24, 2005

(87) PCT Pub. No.: WO2004/077345

PCT Pub. Date: Sep. 10, 2004

(65) Prior Publication Data

US 2006/0155913 A1    Jul. 13, 2006

(30) Foreign Application Priority Data

| Feb. 25, 2003 | (JP) | 2003-046656 |
| Feb. 25, 2003 | (JP) | 2003-046657 |
| Nov. 19, 2003 | (JP) | 2003-389004 |
| Nov. 28, 2003 | (JP) | 2003-398333 |
| Jan. 19, 2004 | (JP) | 2004-009995 |
| Feb. 3, 2004 | (JP) | 2004-026216 |

(51) Int. Cl.
G06K 7/06 (2006.01)

(52) U.S. Cl. .................................................. 235/441

(58) Field of Classification Search ... 455/575.1–575.7, 455/558, 572, 550.1; 235/380, 439, 472.01, 235/472.02, 441
See application file for complete search history.

(56) References Cited

U.S. PATENT DOCUMENTS

| 6,036,088 A * | 3/2000 | Itoh et al. ............... 235/375 |
| 6,204,818 B1 * | 3/2001 | Chang et al. ............. 343/702 |
| 6,626,358 B1 | 9/2003 | Breimesser et al. |
| 6,883,715 B1 | 4/2005 | Fruhauf et al. |
| 7,190,983 B2 * | 3/2007 | Mok .................. 455/575.3 |
| 2002/0183094 A1 | 12/2002 | Seita |
| 2003/0024996 A1 | 2/2003 | Muehlberger et al. |
| 2003/0153356 A1 * | 8/2003 | Liu ........................ 455/558 |
| 2004/0082367 A1 | 4/2004 | Nakanishi et al. |
| 2007/0063058 A1 * | 3/2007 | Iwakata et al. .......... 235/492 |

FOREIGN PATENT DOCUMENTS

| DE | 199 11 416 A1 | 11/2000 |
| GB | 2 358 991 A | 8/2001 |

(Continued)

*Primary Examiner*—Daniel A Hess
(74) *Attorney, Agent, or Firm*—Oliff & Berridge, PLC

(57) ABSTRACT

A SIM reader/writer 1 can be removably loaded with a SIM 2. The SIM reader/writer 1 has a case 1a, a controlling IC chip 3 placed in the case 1a, a USB/ISO7816 conversion IC chip 10, and an coil antenna 11a for noncontact communication placed in the case 1a. The case 1a is provided with a liquid crystal display 4, a fingerprint sensor 5 and a short-distance communication means 11b.

26 Claims, 27 Drawing Sheets

FOREIGN PATENT DOCUMENTS

| | | |
|---|---|---|
| JP | A-11-154204 | 6/1999 |
| JP | A-2002-141986 | 5/2002 |
| JP | A-2002-222442 | 8/2002 |
| JP | A-2002-236892 | 8/2002 |
| JP | A-2002-236901 | 8/2002 |
| JP | A-2002-525720 | 8/2002 |
| JP | A-2002-284825 | 10/2002 |
| JP | A-2002-300072 | 10/2002 |
| JP | A-2002-324220 | 11/2002 |
| JP | A-2002-374339 | 12/2002 |
| JP | A-2003-030596 | 1/2003 |
| WO | WO 02/31762 A1 | 4/2002 |

\* cited by examiner

SIM READER/WRITER AND CELLULAR PHONE

TECHNICAL FIELD

The present invention relates to a SIM reader/writer provided with a detachable SIM having contact and noncontact interfaces and capable of displaying data held by the SIM on a display, and to a cellular phone.

First, the SIM reader/writer is used for authenticating access rights to a personal computer (PC) or the like. Secondly, the SIM reader/writer is used for noncontact gate management in transportation facilities and for payment in noncontact shopping. Thirdly, the SIM reader/writer capable of displaying information is used for a medium required to display information, such as a recording medium for recording and displaying transactions, a commutation commuter pass, a train ticket and an admission ticket for admission to facilities.

A technical field related with the present invention is a field of manufacture and use of SIM reader/writers and SIMs or a field of handling and use of commuter passes and tickets, train tickets and admission tickets.

BACKGROUND ART

Recently, a dual interface IC card having both contact specified in ISO 7816-2 and ISO 7816-3 and USB contact (universal serial bus contact) has been developed (Patent document 1).

An IC card provided with a USB interface can be easily connected to USB-oriented devices, such as personal computers. Interest in using such an IC card as a personnel ID card that can be used as a network access ID card has grown in recent years.

An ID module with a built-in IC chip for gaining access to a network-called an e-token-is used. This ID module is provided with a USB contact interface that can be connected to the USB connector of a personal computer (PC) for plug-and-play without requiring troublesome operations and is used in a system protected by network security. In some cases, this ID module is called a dongle that can be connected to the strap of a cellular phone or a key holder and can be conveniently carried about.

A cellular phone is provided with a small security ID module called a USIM card, such as a SIM or a UIM. The security ID module is used in Japan in combination with the most advanced cellular phone.

The UIM (user identity module) is a small IC card recording subscriber information and issued by a cellular phone company. The UIM is combined with a cellular phone to identify the user and to provide services.

The UIM was developed through the function extension of the SIM (subscriber identity module) similar in function to the UIM. The UIM is capable of recording private information, such as a telephone directory, and personal identification information for credit payment in addition to subscriber information.

Based on the SIM, the UIM is called, in some cases, a USIM (universal SIM). While the SIM is intended to use GSM cellular phone services, the UIM is intended to be used in combination with a cdma 2000 cellular phone of the USA to receive international roaming service.

The SIM or the UIM based on the conventional techniques can be easily manufactured and issued.

The key holder type ID module and the IC card mentioned in Patent Document 1 do not have any noncontact communication function. Therefore, the key holder type ID module and the IC card cannot be used for operating a ticket gate or a gate in a noncontact control mode and are not convenient for use.

The applicant of the present invention patent application previously proposed a SIM holder with a USB connector provided with a contact interface specified in ISO 7816 and a noncontact interface specified in ISO 14443 in Patent Document 2.

The applicant of the present invention patent application previously proposed an IC module, a SIM holder and a SIM each provided with three interfaces, namely, contact interface specified in ISO 7816, a noncontact interface specified in ISO 14443 and a USB contact interface.

Patent Document 1: JP 2002-525720 A
Patent Document 2: JP 2002-284825 A
Patent Document 3: JP 2002-300072 A The key holder type ID module is formed by packaging an IC chip in a resin package by injection molding or the like. Therefore, the key holder type IC module cannot be fabricated and issued by a method by which the conventional IC cards and SIMs are fabricated and issued.

The SIM holders proposed in Patent Documents 2 and 3 are not provided with any display and hence cannot visually display information recorded in the SIM.

DISCLOSURE OF THE INVENTION

The present invention has been made through research on ways to improve the convenience of the key holder type ID module by combining the IC chip of the SIM with contact and noncontact interfaces to provide the key holder type ID module with noncontact communication function, and by combining a coil antenna and a display with a reader/writer to be used in combination with the SIM to provide the reader/writer with a short-distance communication function and a fingerprint sensing function.

In this specification, the term SIM will be used to signify generally small IC cards including UIMs and SIMs.

The present invention provides a SIM reader/writer, capable of being removably loaded with a SIM, including: a case; a terminal plate placed in the case so as to be connected to the SIM; a coil antenna place in the case and connected to the terminal plate; a controlling IC chip placed in the case and connected to the terminal plate; and a display embedded on an outside surface of the case and controlled by the controlling IC chip.

The SIM reader/writer according to the present invention is characterized by a fingerprint sensor placed in the case and connected to the controlling IC chip.

The SIM reader/writer according to the present invention is characterized by a short-distance communication means placed in the case and connected to the controlling IC chip.

The SIM reader/writer according to the present invention is characterized by a USB connector placed on the case, and an IC chip placed in the case, having a USB/contact type IC card communication interface converting function and connected to the USB connector.

The SIM reader/writer according to the present invention is characterized in that the SIM has contact and noncontact interfaces.

The SIM reader/writer according to the present invention is characterized in that the SIM can be loaded with multiple applications.

The SIM reader/writer according to the present invention is characterized in that the short-distance communication means is of the Bluetooth system.

The SIM reader/writer according to the present invention is characterized by an infrared communication connected to the controlling IC chip and placed in the case.

The SIM reader/writer according to the present invention is characterized in that a wiring board holding the terminal plate is placed in the case and 50% or above of the overall length of the coil antenna does not overlap the wiring board in a plane.

The SIM reader/writer according to the present invention is characterized in that the width of a space between the inner side of a part of the coil antenna not overlapping the wiring board in a plane and the outer side of the wiring board is in the range of 0.5 to 3.0 mm.

The SIM reader/writer according to the present invention is characterized in that the gap between a plane containing the coil antenna and a plane containing the wiring board has a size in the range of 0.5 to 3.0 mm.

The SIM reader/writer according to the present invention is characterized by a USB connector placed on the case, and an IC chip having a USB/contact type IC card communication interface converting function, placed in the case and connected to the USB connector.

The SIM reader/writer according to the present invention is characterized by cushiony members attached to a surface, opposite a surface provided with the display, of the case.

The SIM reader/writer according to the present invention is characterized in that cushiony members are made of rubber.

The SIM reader/writer according to the present invention is characterized in that cushiony members are made of a polyurethane resin.

The SIM reader/writer according to the present invention is characterized in that the display is a liquid crystal display.

The SIM reader/writer according to the present invention is characterized by a USB connector placed in the case, and an IC chip having a USB/contact type IC card communication interface converting function, placed in the case and connected to the USB connector.

The present invention provides a cellular phone capable of being removably loaded with a SIM, including: a case; a terminal plate placed in the case and connected to the SIM; a coil antenna placed in the case and connected to the terminal plate; a controlling IC chip placed in the case and connected to the terminal plate; and a display placed on a surface of the case and controlled by the controlling IC chip.

The cellular phone according to the present invention is characterized by a cushiony member attached to a surface of the case, opposite the surface provided with the display.

The cellular phone according to the present invention is characterized in that the case has two parts, the case can be folded in two such that the inside surfaces of the two parts are opposed to each other, and the display is in the inside surface of one of the two parts.

The cellular phone according to the present invention is characterized in that a cushiony member is attached to one of the outer surfaces of the case folded in two, and an auxiliary display connected to the controlling IC chip is placed on the other of the outer surfaces.

The SIM reader/writer according to the present invention is characterized in that a secondary battery for driving the display is placed in the case, and the secondary battery can be charged through a USB connector by an external power source.

The SIM reader/writer according to the present invention is characterized in that the secondary battery is a lithium ion battery.

The SIM reader/writer according to the present invention is characterized by a noncontact communication inhibiting means placed in the case.

The SIM reader/recorder according to the present invention is characterized in that the noncontact communication inhibiting means is provided with a switching circuit interconnecting the terminal plate and the coil antenna.

The SIM reader/writer according to the present invention is characterized in that the noncontact communication inhibiting means includes a relay, a photorelay or a solid-state relay.

The SIM reader/writer according to the present invention is characterized in that the noncontact communication inhibiting means is provided with a variable-capacitance diode for changing the resonance frequency of the coil antenna.

The SIM reader/writer according to the present invention is characterized in that the noncontact communication inhibiting means is provided with a digital potentiometer or a variable resistor for changing the Q of the coil antenna.

The SIM reader/writer according to the present invention is characterized in that the switching circuit is operated by a mechanical switch.

The SIM reader/writer according to the present invention is characterized in that the mechanical switch is a push switch, and noncontact communication is possible while the push switch is closed.

The SIM reader/writer according to the present invention is characterized in that the mechanical switch is a slide switch, and a noncontact communication mode is set alternately in an on state and an off state every time the slide switch is operated.

The SIM reader/writer according to the present invention is characterized by a fingerprint sensor placed in the case and connected to the controlling IC chip.

The SIM reader/writer according to the present invention is characterized by a USB connector placed on the case, and an IC chip placed in the case, connected to the USB connector and having a USB/contact type IC card communication interface converting function.

BEST MODE FOR CARRYING OUT THE INVENTION

First Embodiment

Figure 1:
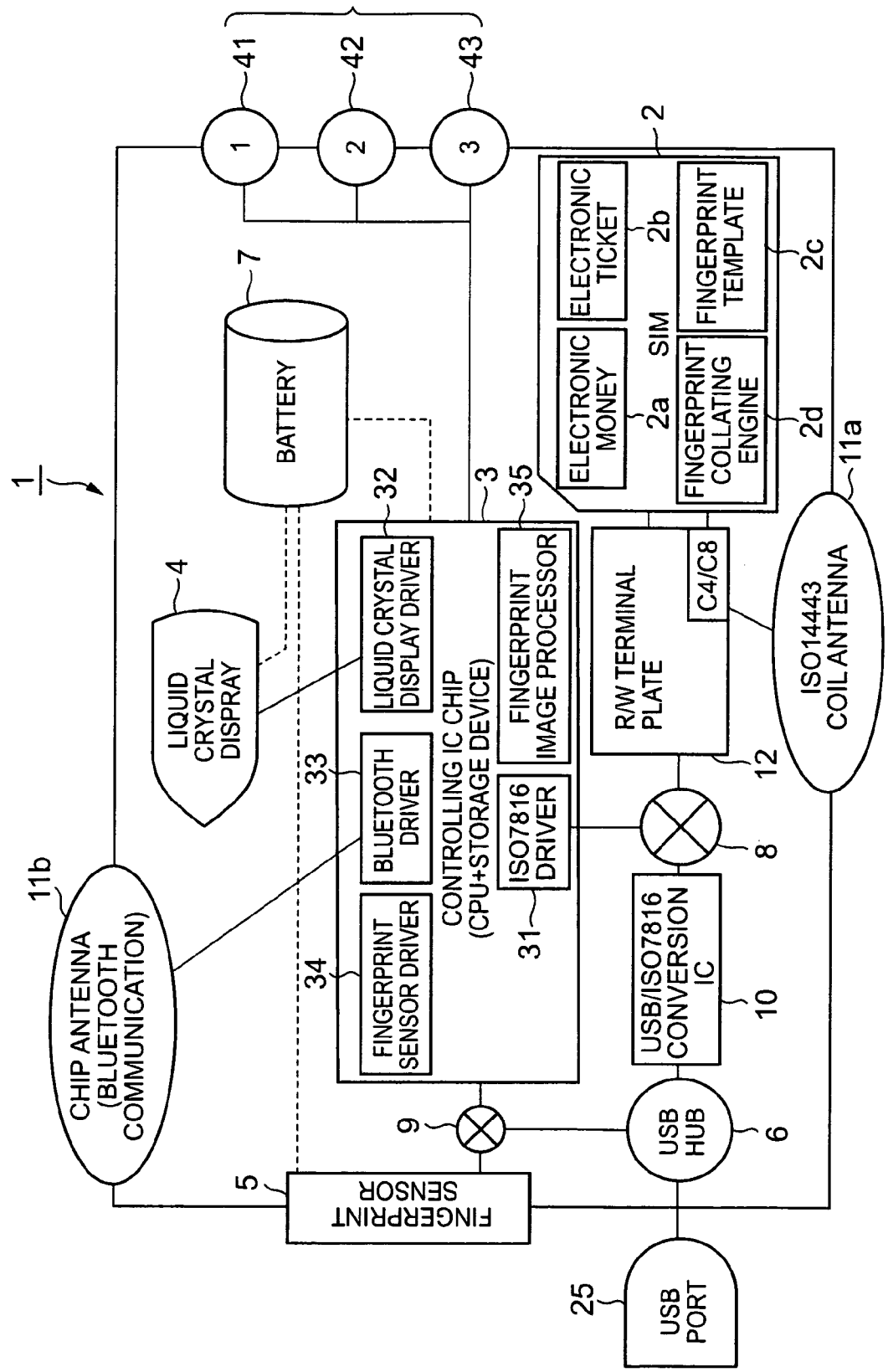
FIG. 1 is a block diagram of a SIM reader/writer (hereinafter, referred to as "SIM R/W") in a first embodiment according to the present invention.
Figure 2:
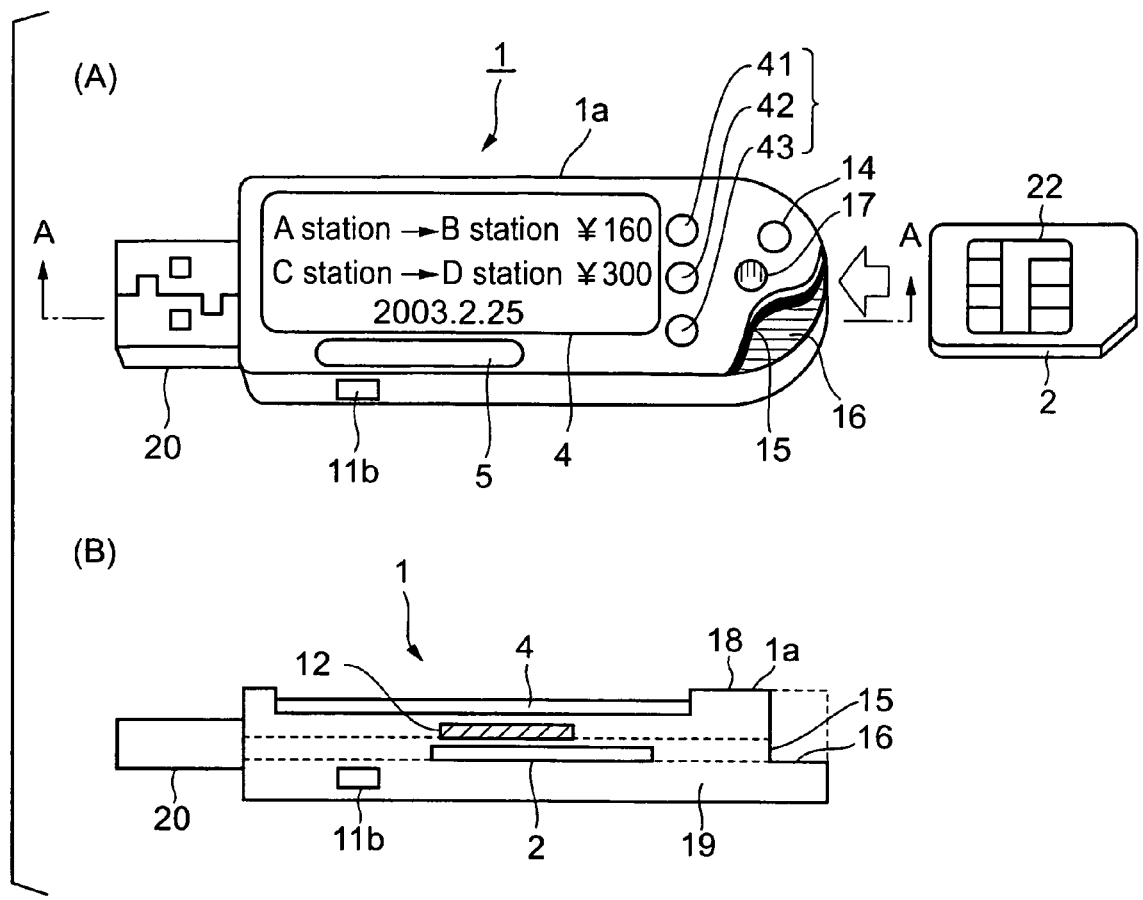
FIGS. 2(A) and 2(B) are a perspective view and a schematic side elevation, respectively, of the SIM reader/writer in the first embodiment.

A SIM reader/writer 1 in the first embodiment according to the present invention will be described with reference to FIGS. 1 to 7. Hereinafter, the term "reader/writer" will be abbreviated to "R/W". FIG. 1 is a block diagram of the SIM R/W 1, FIGS. 2(A) and 2(B) are a perspective view and a schematic side elevation, respectively, of the SIM R/W 1, FIGS. 3 to 6 are views showing the interior configuration of the SIM R/W 1, and FIGS. 7(A) and 7(B) are plan views of a SIM 2.

Referring to FIGS. 1 to 7, the SIM 2 can be removably inserted into the SIM R/W 1 of the present invention. The SIM R/W 1 includes a case 1a, a R/W terminal plate 12 placed in the case 1a to which the SIM 2 is connected, a coil antenna 11a placed in the case 1 and connected to the R/W terminal plate 12, and a controlling IC chip 3 placed in the case 1a.

A liquid crystal display 4 is attached to the case 1a. The liquid crystal display 4 is controlled by the controlling IC chip 3. A USB connector 20 is attached to the case 1a so as to project from the case 1a. The case 1a is provided with a fingerprint sensor 5 connected to the controlling IC chip 3, and a chip antenna (short-distance communication means) 11b for Bluetooth communication.

The controlling IC chip 3 has, in addition to a CPU and a storage device, a driver 31 specified in ISO 7816, a liquid crystal display driver 32, a Bluetooth driver 33, a fingerprint sensor driver 34 and fingerprint image processing software 35. All of those components of the controlling IC chip 3 do not necessarily need to be formed in a single IC chip.

A signal sent out by the SIM 2 is transmitted via the R/W terminal plate 12 and a relay 8 to the controlling IC chip 3. Signals applied to a USB port 25 are transmitted vie a USB hub 6, a USB/ISO7816 conversion IC 10 and the relay 8 to the controlling IC chip 3.

The R/W terminal plate 12 has eight terminals to be connected to the eight terminals of the contact terminal plate of the SIM 2, respectively. Reserve terminals C4 and C8 of the R/W terminal plate 12 are to be connected to the coil antenna 11a placed in the case 1a of the SIM R/W 1. The coil antenna 11a serves for noncontact communication conforming to ISO 14443.

Preferably, the SIM R/W 1 is provided with a battery (secondary battery) 7 as a power supply for driving the fingerprint sensor 5, the liquid crystal display 4 and the controlling IC chip 3. The battery 7 is placed in the case 1a. Preferably, the battery 7 is a thin lithium ion battery.

The case 1a is provided with switch buttons 41, 42 and 43. The switch button 41 is operated to close or open a power switch, the switch button 42 is operated to select a Bluetooth communication mode, and the switch button 43 is operated to select a desired displayed function and a desired operation.

When the USB connector 20 of the SIM R/W 1 is connected to the USB port of an external device, such as a personal computer (PC), the battery 7 cannot be connected to the circuits of the SIM R/W 1. When the SIM R/W 1 is connected to an external device, the CPU of the controlling IC chip 3 does not operate, the liquid crystal display 4 does not display any image and the fingerprint sensor 5 does not function even if the switch button 41 is operated to close the power switch.

The liquid crystal display 4 displays images only in a state where the SIM R/W 1 is not connected to the PC and the switch button 41 is operated to close the power switch.

In a state where the switch button 41 has been operated to close the power switch, the relay 8 connects the CPU of the controlling IC chip 3 to the R/W terminal plate 12. In a USB drive mode, in which the USB connector 20 is inserted into the USB port of the PC, the relay 8 connects the CPU of the controlling IC chip 3 to the USB port 25.

If the power switch is opened during communication in a communication mode conforming ISO 14443 through the coil antenna 11a or the USB connector 20 is inserted in the USB port 25 of the PC, hardware resetting takes place and the SIM 2 returns ATR (answer to reset). Thus noncontact communication is forcibly interrupted.

As mentioned above, the SIM R/W 1 is provided with a chip antenna (short-distance communication means) 11b. Preferably, the short-distance communication means is used for Bluetooth communication. The short-distance communication means may be used for infrared communication.

High-directivity infrared communication is used for communication between the SIM R/W 1 and an external device mainly when the SIM R/W 1 and the external device spaced from the SIM R/W 1 can be linearly interconnected. Bluetooth communication is possible even if the SIM R/W 1 and the external device are not linearly interconnected.

Noncontact communication conforming ISO 14443 is possible only when the distance between the SIM R/W and an outside terminal device is between about 10 and about 20 cm. The short-distance communication means ensures communication between the SIM R/W and an outside terminal device which are spaced apart by about 10 m.

Therefore, payment of a large amount of money can be achieved by the Bluetooth and successive circulation of an electronic value can be achieved by the Bluetooth. Account settlement between a plurality of terminals can be instantly completed by the Bluetooth.

The short-distance communication means includes the Bluetooth chip antenna 11b for Bluetooth communication. The Bluetooth chip antenna 11b and a Bluetooth driver 33 included in the controlling IC chip 3 exchange signals by Bluetooth communication. The Bluetooth driver 33 is a transmitter-receiver module. The transmitter-receiver module may be formed in a single chip. Small antennas of a length on the order of 8 mm as a Bluetooth chip antenna 11b are developed and marketed by many companies.

The infrared communication means includes an infrared driver and an infrared transmitter-receiver instead of the Bluetooth driver of the controlling IC chip 3 and the chip antenna.

The infrared transmitter-receiver has an infrared emitter, an infrared receiver, a filter and such. The infrared transmitter-receiver can communicate with an external electronic device of the same configuration to exchange data with the external electronic device.

Information stored in SIM 2 is processed by the controlling IC chip 3, the processed information is converted into light signals through photoelectric conversion by the infrared emitter of the infrared transmitter-receiver, and the light signals are sent to the external electronic device. Light signals received from the external electronic device by the infrared receiver are converted into electric signals through photoelectric conversion and the electric signals are sent through the controlling IC chip 3 to the SIM 2.

The SIM R/W 1 is provided with the fingerprint sensor 5 on the case 1a. Fingerprint data (biometric data) on the finger print of a special user authorized to use the PC or the SIM R/W 1 is stored in the SIM 2. The operation of the SIM R/W 1 is inhibited or the further operation of the SIM 2 is inhibited unless the SIM 2 approves data provided by the fingerprint sensor 5.

The fingerprint sensor 5 may be either of a flat type fingerprint sensor against which the fingertip is pressed and a sweep type fingerprint sensor having a surface to be rubbed with the fingertip. It is desirable to form the SIM R/W 1 in a small size when the fingerprint sensor 5 is of the sweep type because the sweep type fingerprint sensor has a small area.

Preferably, the fingerprint sensor 5 is an electrostatic condenser type fingerprint sensor. The flat type fingerprint sensor 5 provides an electric signal representing the arrangement of irregularities in a fingertip. The flat type fingerprint sensor 5 is provided with many line sensors capable of generating electric signals representing irregularities in a fingertip. When a fingertip is pressed against the flat type fingerprint sensor 5, the fingerprint sensor 5 reads a fingerprint.

The sweep type fingerprint sensor 5 has a sensing surface of a width of several millimeters. When the sensing surface is rubbed with a fingertip, the sweep type fingerprint sensor 5 is able to recognize the features of a fingerprint. Even if the sensing surface is rubbed at an irregular sweeping speed and at an irregular pressure, the sweep type fingerprint sensor 5 having a correcting function provides a fingerprint in a correct pattern. The SIM R/W 1 of the present invention may employ a Finger Chip (FCD4B14, commercially available from ATMEL).

Fingerprint data provided by the fingerprint sensor 5 is given to a fingerprint image processor 35 to calculate parameters of the fingerprint. The parameters characterize features of the fingerprint and relations between the features. For example, features are breakages in lines of the fingerprint (end points) and bifurcations, and relations are curvatures of lines of the fingerprint and the number of ridges crossing lines connecting feature points.

The calculated parameters are compared with user's fingerprint feature data obtained by processing the image of user's fingerprint and stored in the fingerprint template 2c of the SIM 2 to determine whether or not the user operating the SIM R/W 1 is an authorized person. Since the amount of fingerprint data on a fingerprint image is excessively large, fingerprint data on a fingerprint image processed by image processing is stored.

A fingerprint collating engine 2d collates the received fingerprint parameters with the fingerprint data stored in the fingerprint template 2c. The SIM R/W 1 or the SIM 2 is able to proceed to the next operation when the fingerprint data obtained by the fingerprint sensor 5 coincides with the fingerprint data on the registered authorized user stored in the fingerprint template 2c.

Fingerprints of about ten fingers of a plurality of persons can be easily registered on the fingerprint template 2c. Fingerprint collation can be achieved in a short time by a fingerprint collator on the market.

When the USB connector 20 of the SIM R/W 1 is connected to the USB port of an external device, such as a PC, the fingerprint sensor 5 is connected to the PC by a relay 9 and the USB hub 6.

When the SIM R/W 1 is not connected to a PC or the like and is powered by the battery, the relay 9 connects the fingerprint sensor 5 to the controlling IC chip 3.

The case 1a of the SIM R/W 1 may be formed in any shape, provided that the SIM R/W 1 is easy to carry. Preferably, the case 1a is formed such that the USB connector 20 can be inserted into the USB port 25 and the SIM 2 can be inserted into the case 1a in the same direction as shown in FIG. 2.

As shown in FIG. 2(A), the liquid crystal display 4 of the SIM R/W 1 is embedded in the outside surface of the 1a. The USB connector 20 projects from the left end of the case 1a. An insertion opening 15 is formed in the right end of the case 1a. The SIM 2 is inserted through the insertion opening 15 into the case 1a.

A step 16 is formed in a right end part of the case 1a on a level below that of the liquid crystal display 4 so as to extend rightward from the insertion opening 15. The SIM 2 can be easily inserted through the insertion opening 15 into the case 1a by placing the SIM 2 on the step 16 and pushing the SIM 2 into the case 1a. The switch buttons 41, 42 and 43 are arranged in a part between the liquid crystal display 4 and the insertion opening 15 of the case 1a. Indicated at 14 is a pilot LED lamp for indicating that components of the SIM R/W 1 are connected to the battery.

When a strap or the like is passed through a key holding hole 17 and is tied to the SIM R/W 1 the SIM 2 is prevented from being carelessly dropped while the SIM R/W 1 is being carried about.

Pieces of information held by the SIM 2 can be successively displayed by the liquid crystal display 4 by operating the switch button 43.

The contents of displayed information are dependent on application software loaded into the SIM 2. If the SIM 2 is loaded with electronic money 2a, the contents of displayed information are the balance of the bank, a list of payment and such. If the SIM 2 is loaded with an electronic ticket 2b, the contents of displayed information are the date and place of use, the beginning time, the number of the reserved seat and such. If the SIM 2 is used as a commuter ticket, the contents of displayed information are the section for which the commuter ticket is valid, the term of validity, user's name and such.

Preferably, the SIM 2 can be loaded with a plurality of applications.

The liquid crystal display 4 may be a reflection color liquid crystal display capable of displaying color images by a dot matrix system. The liquid crystal display 4 is capable of graphic display. The liquid crystal display 4 has a thickness between about 1.0 and about 1.5 mm. The liquid crystal display 4 has a screen of a width between 20 and 30 mm and a length between about 50 and about 70 mm.

A thin organic EL display, which operates at low power consumption, may be used as an alternative to the liquid crystal display 4.

FIG. 2(B) is a sectional view taken on the line A-A in FIG. 2(A). As shown in FIG. 2(B), the SIM 2 is installed in the SIM R/W 1. The R/W terminal plate 12 is disposed between the SIM 2 and the liquid crystal display 4 so as to be connected to the contact terminal plate 22 of the SIM 2. The R/W terminal plate 12 may be formed so as to extend over the entire lower surface of the liquid crystal panel of the liquid crystal display 4 and may be used also as a wiring board.

The case 1a of the SIM R/W 1 has a cover member 18 and a case member 19, which are formed separately by molding. The liquid crystal display 4 and the R/W terminal plate 12 are attached to the cover member 18. The cover member 18 and the case member 19 are joined together to form the case 1a after arranging the components including a wiring board of the SIM R/W 1 in the case member 19. The coil antenna 11a, not shown in FIG. 2(B), may be formed around the terminal plate 12, on the inside surface of the cover member 18 or on the inside surface of the case member 19.

No part is placed on the back surface of the SIM R/W 1. A battery charging structure or the like, not shown, may be formed on the back surface of the SIM R/W 1.

If the case member 19 is made of a transparent resin by molding, a picture of the user's face and the user's name printed on the SIM 2 can be seen through the case body 19.

FIGS. 3 to 6 show the internal configuration of the SIM R/W 1. The relation between the R/W terminal plate 12 and the coil antenna 11a disposed behind the liquid crystal display 4 is shown in FIGS. 3 to 6.

Figure 3:
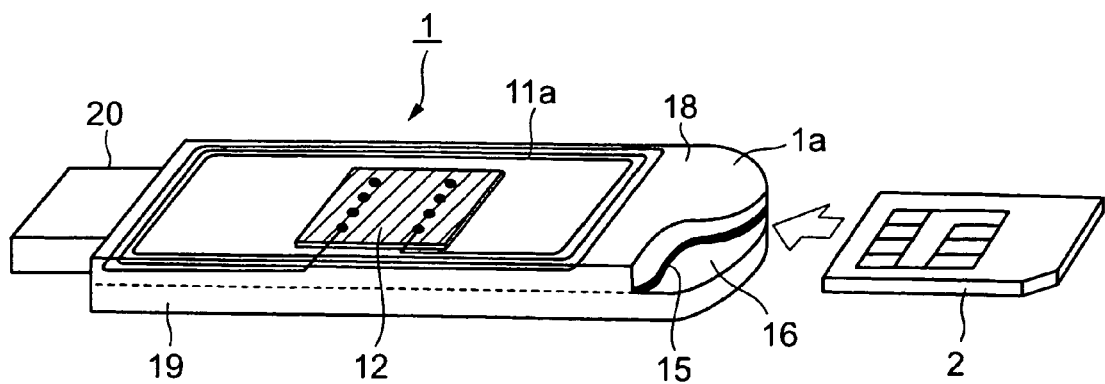
FIG. 3 is a perspective view of the SIM reader/writer in the first embodiment and a SIM, showing a contact terminal plate attached to the back surface of the SIM.
Figure 4:
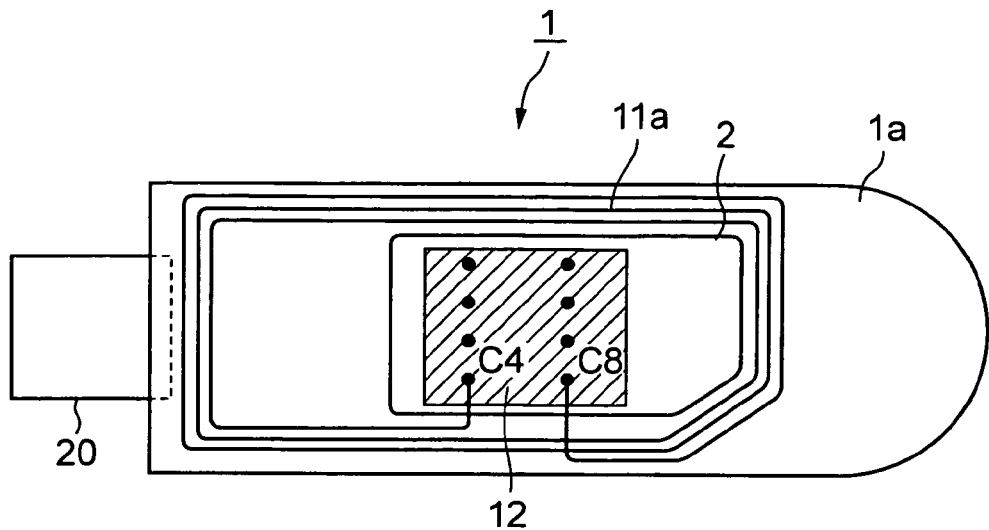
FIG. 4 is a plan view of the SIM shown in FIG. 3.
Figure 5:
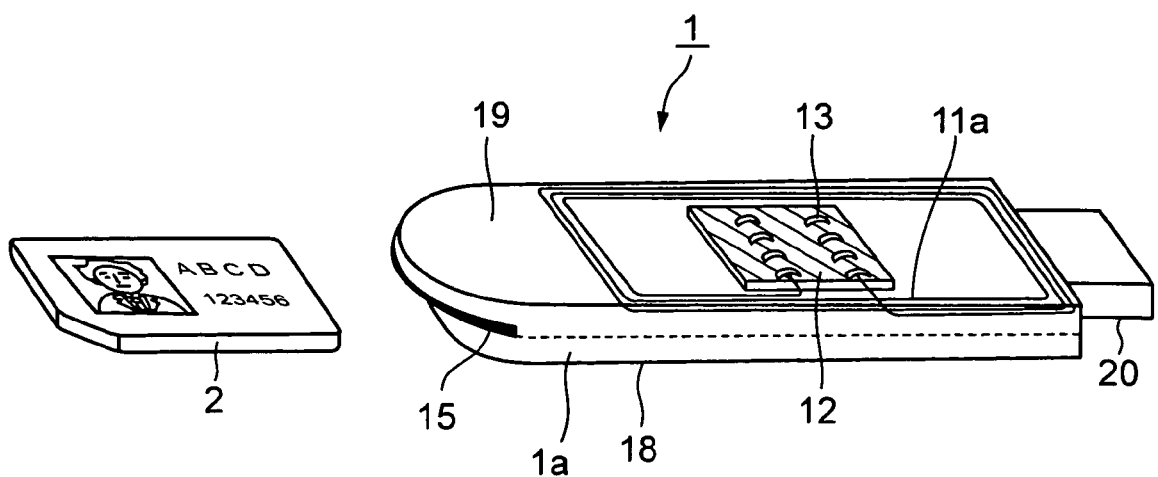
FIG. 5 is a perspective view of the SIM reader/writer in the first embodiment and the SIM, showing the front surface, opposite the back surface to which the contact terminal plate is attached, of the SIM.
Figure 6:
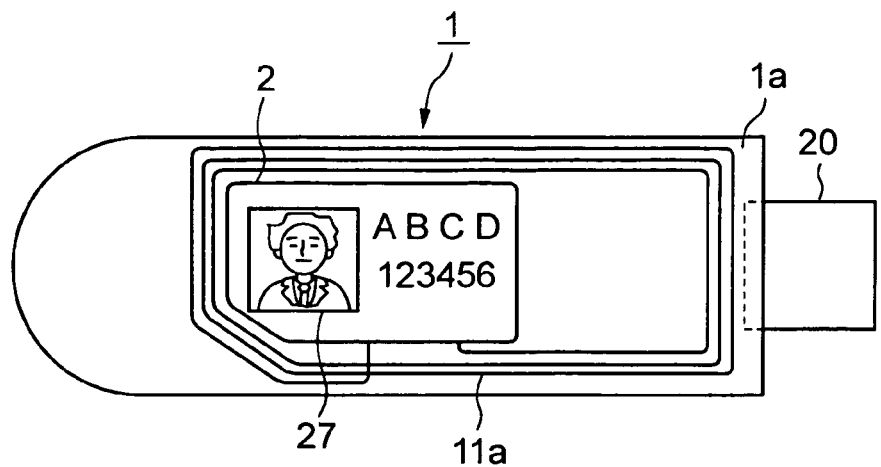
FIG. 6 is a plan view of the SIM reader/writer in the first embodiment, showing the back surface of the SIM reader/writer.
Figure 7:
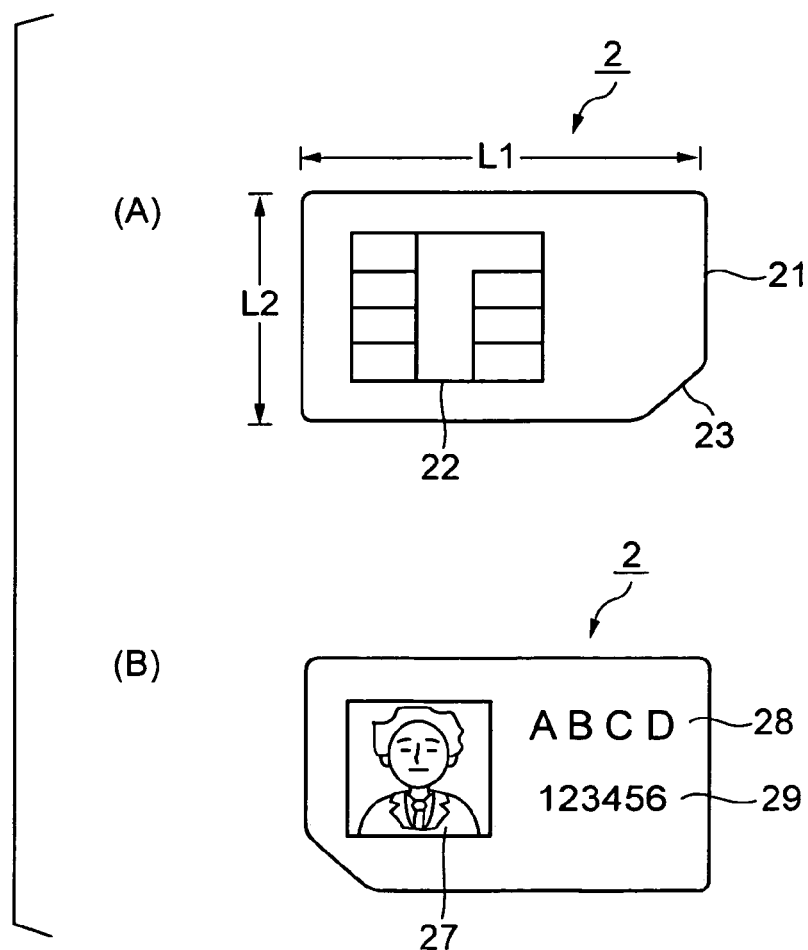
FIGS. 7(A) and 7(B) are plan views of the SIM.

FIG. 3 is a perspective view showing a part, on the side of the contact terminal plate 22 of the SIM 2, of the SIM R/W 1, FIG. 4 is a plan view of the part shown in FIG. 3, FIG. 5 is a perspective view of a part, on the side opposite the side of the contact terminal plate 22 of the SIM 2, of the SIM R/W 1 and FIG. 6 is a plan view of the part, on the side opposite the side of the contact terminal plate 22 of the SIM 2, of the SIM R/W 1.

As shown in FIGS. 3 and 4, the coil antenna 11a is formed on a peripheral part of the inside surface of the cover member 18. The opposite ends of the coil antenna 11a are connected to the terminals C4 and C8 of the R/W terminal plate 12, respectively. The SIM 2 is inserted into the SIM R/W 1 from the right side, as viewed in FIG. 3 and is held fixedly in a space under the R/W terminal plate 12.

Wiring lines connected to the USB connector 20 are omitted in FIGS. 3 and 4. The terminals C5 (GND), C1 ($V_{cc}$), C2 (RST) and C7 (I/O) are connected to the USB/ISO7816 conversion IC 10.

An IC chip having a USB function is mentioned in Patent document 1 and the USB (D+) and the USB (D−) use the terminals C4 and C8, respectively, in an example mentioned in Patent document 1. Since the SIM R/W 1 of the present invention employs the USB/ISO7816 conversion IC 10, a dual IC module having a conventional function can be used.

Since the terminals of the coil antenna 11a are connected to the terminals C4 and C8, the SIM 2 and the R/W do not use a special terminal plate provided with eight or more terminals.

As shown in FIG. 5, eight contact pins 13 protrude from the back surface of the R/W terminal plate 12 so as to be in contact with the contact terminal plate 22 of the SIM 2.

FIG. 6 shows the SIM 2 installed in the SIM R/W 1. The SIM 2 is inserted along the case member 19 into a space under the R/W terminal plate 12. Therefore, a picture 27 of the user's face printed on the SIM 2 can be visually recognized if the case member 19 is made of a transparent resin.

As mentioned above, the noncontact communication function is blocked when the SIM R/W 1 is connected to a PC The SIM R/W 1 can be utilized for managing payment at convenience stores and restaurants, passing ticket gates of transportation facilities and entering and exiting facilities by using a noncontact interface when the SIM R/W 1 is not connected to a PC.

Settlement of an account with a recipient at a distance longer than a distance for noncontact communication conforming to ISO 14443 can be achieved by using the chip antenna 11b, namely, the short-distance communication means.

The SIM R/W 1 can be directly connected to a PC and any additional R/W as peripheral equipment is not needed.

FIGS. 7(A) and 7(B) are plan views respectively showing the front surface provided with the contact terminal plate 22 of the SIM 2 and the back surface of the SIM 2 opposite the front surface.

As shown in FIG. 7(A), the SIM 2 has a base plate 21 having a long side L1 of 25 mm in length and a short side L2 of about 15 mm in length. The SIM 2 is a thin plate having a uniform thickness of about 1.0 mm or below, usually, 0.76 mm.

A contact/noncontact dual mode IC module is embedded in the back substrate of the contact terminal plate 22. One of the corners of the rectangular SIM is cut to form a bevel 23. The bevel 23 facilitates locating the SIM 2 relative to the SIM R/W 1 when the SIM 2 is inserted into the SIM R/W 1.

As shown in FIG. 7(B), the picture 27 of the user's face, the user's name 28 and a number 29 can be printed on the surface opposite the surface on which the contact terminal plate 22 is attached to facilitate identifying the user. If the case member 19 of the case 1a of the SIM R/W 1 is transparent, the user can be visually identified by the SIM 2 installed in the SIM R/W 1.

When the SIM 2 corresponds to an IC card capable of being loaded with multiple applications, the SIM 2 can be loaded with multiple applications, such as electronic money, an electronic ticket, a fingerprint template, a fingerprint collating engine and a personnel ID card.

As obvious to those skilled in the art, the SIM R/W of the present invention described above is not limited to use in combination with the PC and can be used in combination with a device similar in function to the PC, such as a POS register or a digital camera.

The SIM R/W of the present invention can be used as a USB interface for the authentication of PC access privilege. The SIM R/W of the present invention provided with the ISO 14443 noncontact communication function and the short-distance communication means for Bluetooth communication can be used as an electronic ticket and as electronic money for various noncontact transactions, such as settlement of an account.

Since the SIM R/W is provided with the fingerprint sensor, the user can be authenticated on the basis of biometric data and hence the dishonest use of the PC or the like can be prevented with high reliability.

Since the contents of the information held by the storage device of the SIM can be displayed by the liquid crystal display, work for displaying the contents of the information by the display of a PC or a special terminal device or work for printing out the contents of the information can be omitted.

Second Embodiment

Figure 8:
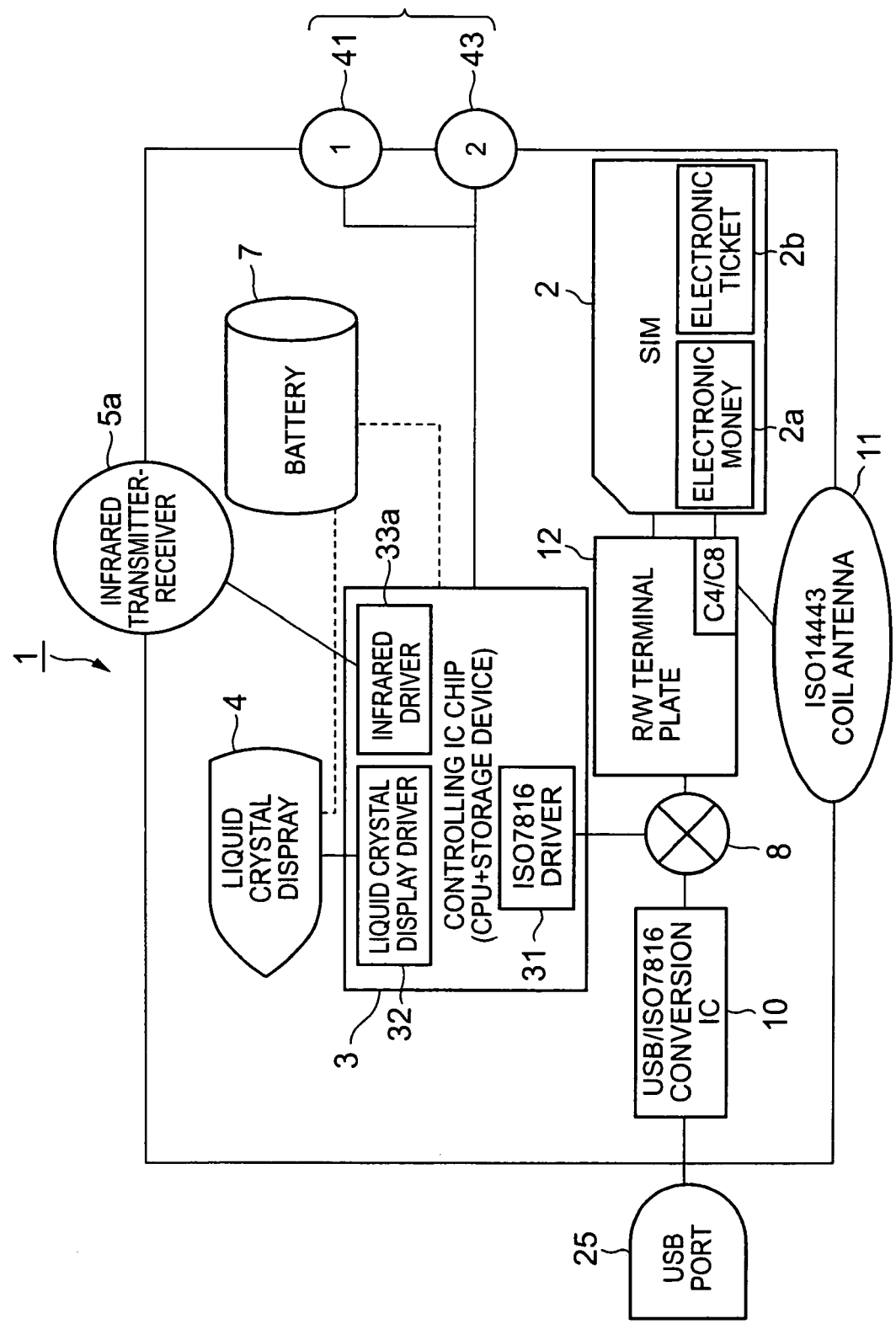
FIG. 8 is a block diagram of a SIM reader/writer with a liquid crystal display in a second embodiment according to the present invention.

A SIM R/W 1 with a liquid crystal display 4 in a second embodiment according to the present invention will be described with reference to the accompanying drawings. FIG. 8 is a block diagram of the SIM R/W 1 with the liquid crystal display 4, FIGS. 9(A) and 9(B) are a perspective view and a schematic side elevation, respectively, of the SIM R/W 1 and FIGS. 10 to 13 are views showing the inside configuration of the SIM R/W 1.

A SIM 2 can be removably loaded into the SIM R/W 1 with a liquid crystal display 4 according to the present invention (hereinafter, referred to simply as "SIM R/W") as shown in FIG. 8. The SIM R/W 1 includes a case 1a, a R/W terminal plate 12 placed in the case 1a, to which the SIM 2 is connected, a coil antenna 11a placed in the case 1 and connected to the R/W terminal plate 12, and a controlling IC chip 3 placed in the case 1a. The liquid crystal display 4 is attached to the case 1a. The liquid crystal display 4 is controlled by the controlling IC chip 3. A USB connector 20 is attached to the case 1a so as to project from the case 1a. The USB connector 20 may be either of a male connector and a female connector.

The controlling IC chip 3 has, in addition to a CPU and a storage device, a driver 31 specified in ISO 7816, a liquid crystal display driver 32 and an infrared driver 33 for infrared communication. All of those components of the controlling IC chip 3 do not necessarily need to be formed in a single IC chip.

A signal sent out by The SIM 2 is transmitted via the R/W terminal plate 12 and a relay 8 to the controlling IC chip 3. Signals applied to the USB connector 20 and a USB port 25 are transmitted vie a USB/ISO7816 conversion IC 10 and the relay 8 to the controlling IC chip 3.

The R/W terminal plate 12 has eight terminals to be connected to the eight terminals of the contact terminal plate of the SIM 2, respectively. Reserve terminals C4 and C8 of the R/W terminal plate 12 are to be connected to the coil antenna 11 placed in the case 1a of the SIM R/W 1. The coil antenna 11 serves for noncontact communication conforming to ISO 14443.

Preferably, the SIM R/W 1 is provided with a battery (secondary battery) 7 as a power supply for driving the liquid crystal display 4 and the controlling IC chip 3. The battery 7 is placed in the case 1a. Preferably, the battery 7 is a thin lithium ion battery.

The case 1a is provided with switch buttons 41 and 43. The switch button 41 is operated to close or open the power switch and the switch button 43 is operated to select a desired displayed function and a desired operation.

When the USB connector 20 of the SIM R/W 1 is connected to the USB port of a PC, the battery 7 cannot be connected to the circuits of the SIM R/W 1. When the SIM R/W 1 is connected to the PC, the CPU of the controlling IC chip 3 does not operate and the liquid crystal display 4 does not display any image even if the switch button 41 is operated to close the power switch.

The liquid crystal display 4 displays images only in a state where the SIM R/W 1 is not connected to the PC and the switch button 41 is operated to close the power switch.

In a state where the switch button 41 has been operated to close the power switch, the relay 8 connects the CPU of the controlling IC chip 3 to the R/W terminal plate 12. In a USB drive mode, in which the USB connector 20 is inserted into the USB port of the PC, the relay 8 connects the CPU of the controlling IC chip 3 to the USB port 25.

If the power switch is opened during communication in a communication mode conforming ISO 14443 through the coil antenna 11 or the USB connector 20 is inserted in the USB port 25 of the PC, hardware resetting takes place and the SIM 2 returns ATR (answer to reset). Thus noncontact communication is forcibly interrupted.

The SIM R/W 1 is provided with an infrared transmitter-receiver 5a. The infrared transmitter-receiver 5a is controlled by an infrared driver 33a included in the controlling IC chip 3. The infrared transmitter-receiver 5a has an infrared emitter, a photodetector and a filter. The infrared transmitter-receiver 5a is capable of communicating with an external electronic device provided with a transmitter-receiver similar to the infrared transmitter-receiver 5a to exchange data.

The controlling IC chip 3 processes information provided by the SIM 2. The information is converted into a light signal through photoelectric conversion by the infrared transmitter-receiver 5a. The infrared emitter sends the light signal to the external electronic device. A signal received from the external electronic device is converted into an electric signal through photoelectric conversion by the infrared emitter of the infrared transmitter-receiver 5a. The electric signal is transmitted through the controlling IC chip 3 to the SIM 2.

Thus it is possible to achieve noncontact communication between two terminal devices spaced apart by a distance longer than a maximum distance for noncontact communication conforming to ISO 14443.

Figure 9:
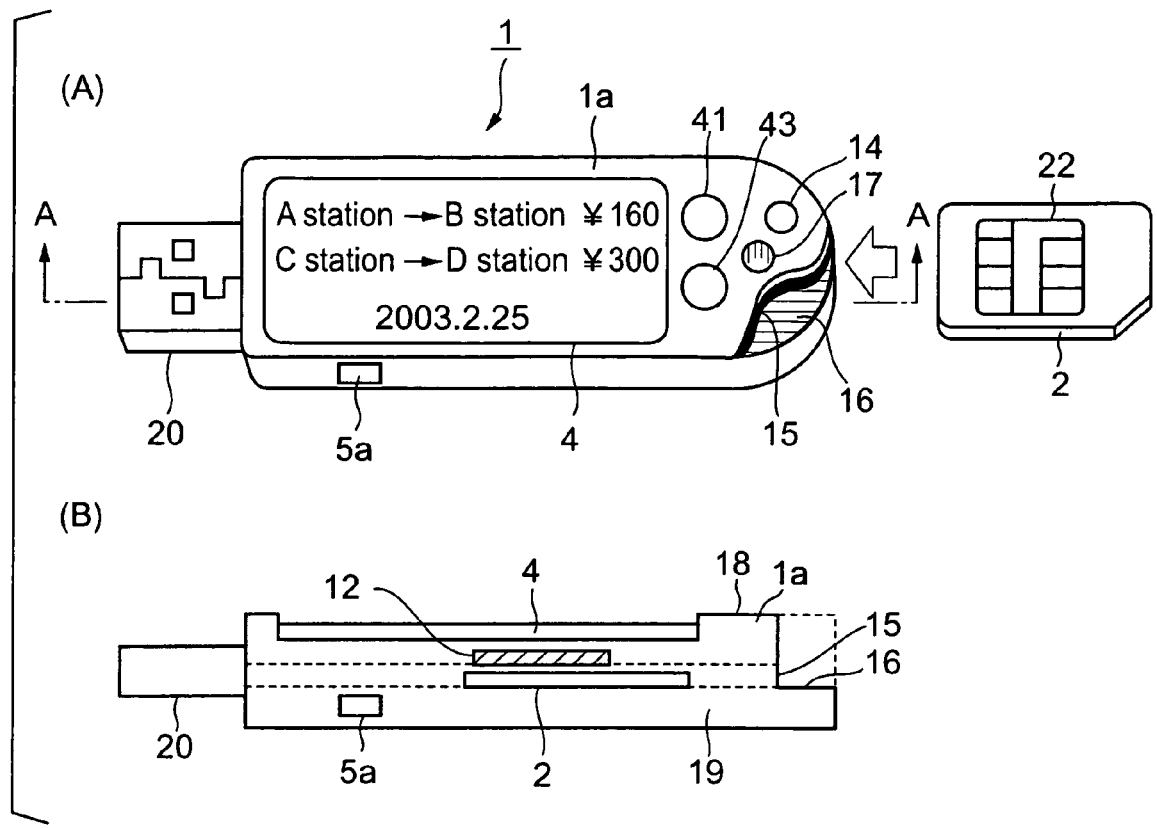
FIGS. 9(A) and 9(B) are a perspective view and a schematic side elevation, respectively, of the SIM reader/writer in the second embodiment.

The case 1a of the SIM R/W 1 may be formed in any shape, provided that the SIM R/W 1 is easy to carry. Preferably, the case 1a is formed such that the USB connector 20 can be inserted into the USB port 25 and the SIM 2 can be inserted into the case 1a in the same direction as shown in FIG. 9.

As shown in FIG. 9(A), the liquid crystal display 4 of the SIM R/W 1 is embedded in the outside surface of the 1a. The USB connector 20 projects from the left end of the case 1a. An insertion opening 15 is formed in the right end of the case 1a.

A step 16 is formed in a right end part of the case 1a on a level below that of the liquid crystal display 4 so as to extend rightward from the insertion opening 15. The SIM 2 can be easily inserted through the insertion opening 15 into the case 1a by placing the SIM 2 on the step 16 and pushing the SIM 2 into the case 1a. The switch buttons 41 and 43 are arranged in a part between the liquid crystal display 4 and the insertion opening 15 of the case 1a. Indicated at 14 is a pilot LED lamp for indicating that components of the SIM R/W 1 are connected to the battery.

When a strap or the like is passed through a key holding hole 17 and is tied to the SIM R/W 1, the SIM 2 is prevented from being carelessly dropped while the SIM R/W 1 is being carried about.

Pieces of information held by the SIM 2 can be successively displayed by the liquid crystal display 4 by operating the switch button 43.

The contents of displayed information are dependent on an application software loaded into the SIM 2. If the SIM 2 is loaded with an electronic money 2a, the contents of displayed information are the balance of the bank, a list of payment and such. If the SIM 2 is loaded with an electronic ticket 2b, the contents of displayed information are the date and place of use, the beginning time, the number of the reserved seat and such. If the SIM 2 is used as a commuter ticket, the contents of displayed information are the section for which the commuter ticket is valid, the term of validity, user's name and such. Preferably, the SIM 2 can be loaded with a plurality of applications.

The liquid crystal display 4 may be a reflection color liquid crystal display capable of displaying color images by a dot matrix system. The liquid crystal display 4 is capable of graphic display. The liquid crystal display 4 has a thickness between about 1.0 and about 1.5 mm. The liquid crystal display 4 has a screen of a width between 20 and 30 mm and a length between about 50 and about 70 mm.

A thin organic EL display, which operates at a low power consumption, may be used as an alternative to the liquid crystal display 4.

FIG. 9(B) is a sectional view taken on the line A-A in FIG. 9(A). As shown in FIG. 9(B), the SIM 2 is installed in the SIM R/W 1. The R/W terminal plate 12 is disposed between the SIM 2 and the liquid crystal display 4 so as to be connected to the contact terminal plate 22 of the SIM 2. The R/W terminal plate 12 may be formed so as to extend over the entire lower surface of the liquid crystal panel of the liquid crystal display 4 and may be used also as a wiring board.

The case 1a of the SIM R/W 1 has a cover member 18 and a case member 19, which are formed separately by molding. The liquid crystal display 4 and the R/W terminal plate 12 are attached to the cover member 18. The cover member 18 and the case member 19 are joined together to form the case 1a after arranging the components including a wiring board of the SIM R/W 1 in the case member 19. The coil antenna 11a, not shown in FIG. 9(B), may be formed around the terminal plate 12, on the inside surface of the cover member 18 or on the inside surface of the case member 19.

No part is placed on the back surface of the SIM R/W 1. A battery charging structure or the like, not shown, may be formed on the back surface of the SIM R/W 1.

If the case member 19 is made of a transparent resin by molding, a picture of the user's face and the user's name printed on the SIM 2 can be seen through the case body 19.

FIGS. 10 to 13 show the inside configuration of the SIM R/W 1. The relation between the R/W terminal plate 12 and the coil antenna 11 disposed behind the liquid crystal display 4 is shown in FIGS. 10 to 13.

Figure 10:
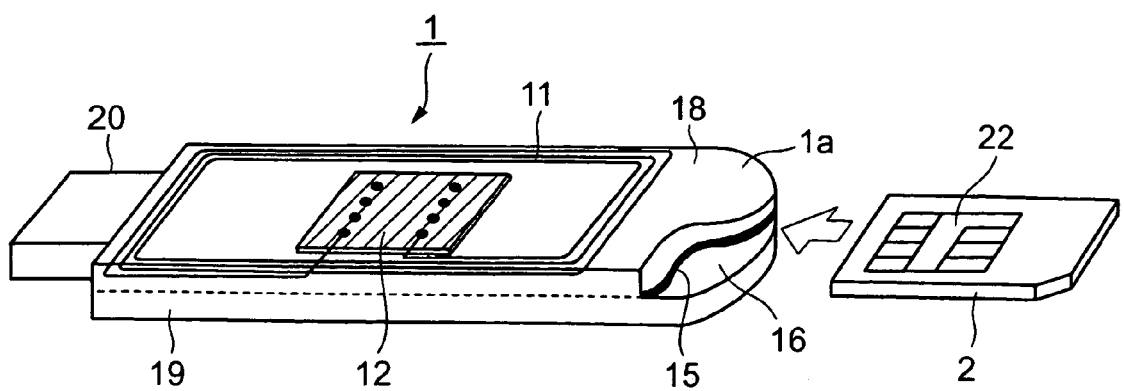
FIG. 10 is a perspective view of the SIM reader/writer in the second embodiment and a SIM, showing the interior of the SIM reader/writer and a contact terminal plate attached to the back surface of the SIM.
Figure 11:
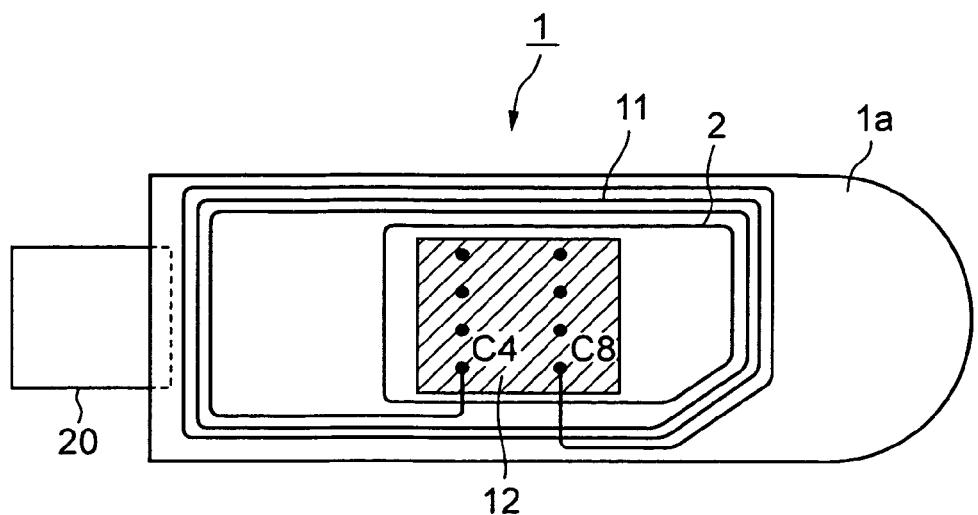
FIG. 11 is a plan view of the SIM reader/writer shown in FIG. 10.
Figure 12:
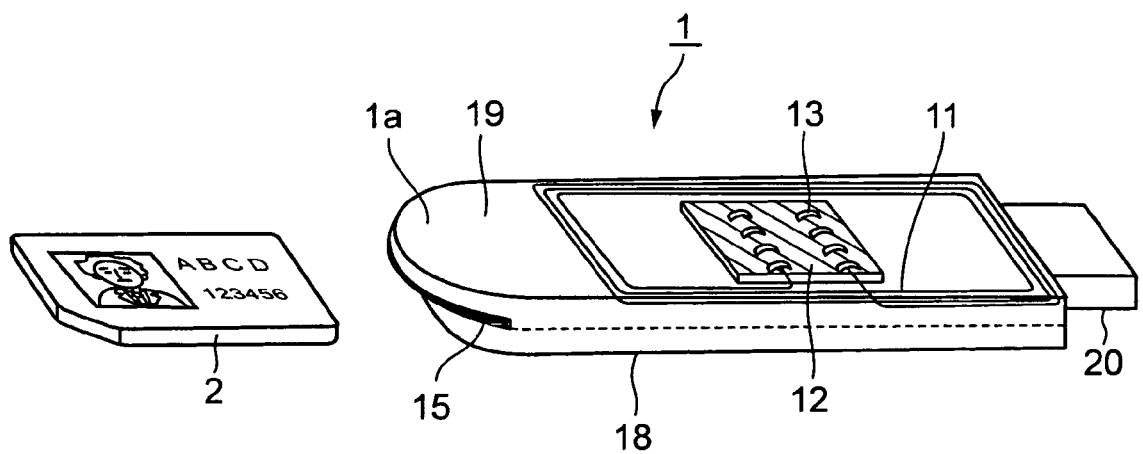
FIG. 12 is a perspective view of the SIM reader/writer in the second embodiment and the SIM, showing the interior of the SIM reader/writer and the front surface, opposite the back surface to which the contact terminal plate is attached, of the SIM.
Figure 13:
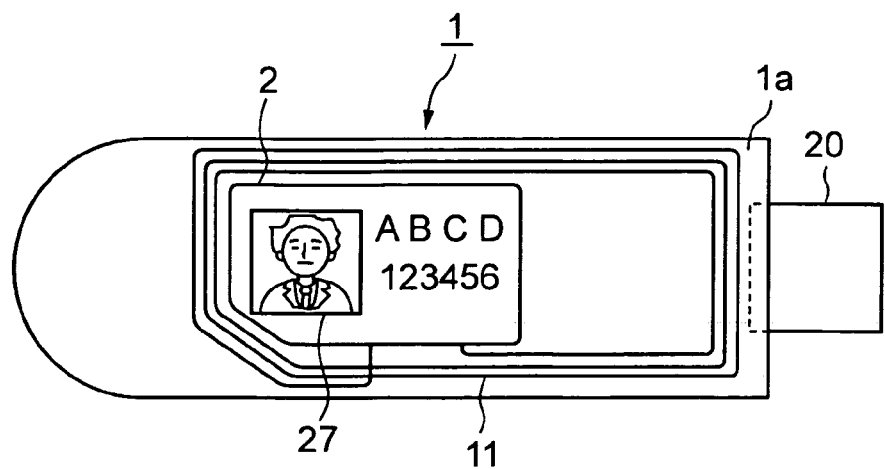
FIG. 13 is a plan view of the SIM reader/writer in the second embodiment, showing the back surface of the SIM reader/writer.

FIG. 10 is a perspective view showing a part, on the side of the contact terminal plate 22 of the SIM 2, of the SIM R/W 1, FIG. 11 is a plan view of the part shown in FIG. 10, FIG. 12 is a perspective view of a part, on the side opposite the side of the contact terminal plate 22 of the SIM 2, of the SIM R/W 1 and FIG. 13 is a plan view showing the interior of the SIM R/W 1.

As shown in FIGS. 10 and 11, the coil antenna 11 is formed on a peripheral part of the inside surface of the cover member 18. The opposite ends of the coil antenna 11 are connected to the terminals C4 and C8 of the R/W terminal plate 12, respectively. The SIM 2 is inserted into the SIM R/W 1 from the right side, as viewed in FIG. 10. The SIM 2 is held fixedly in a space under the R/W terminal plate 12.

Wiring lines connected to the USB connector 20 are omitted in FIGS. 10 and 11. The terminals C5 (GND), C1 ($V_{cc}$), C2 (RST) and C7 (I/O) are connected to the USB/ISO7816 conversion IC 10.

An IC chip having a USB function is mentioned in Patent document 1 and the USB(D+) and the USB(D-) use the terminals C4 and C8, respectively, in an example mentioned in Patent document 1. Since the SIM R/W 1 of the present invention employs the USB/ISO7816 conversion IC 10, a dual IC module having a conventional function can be used.

Since the terminals of the coil antenna 11 are connected to the terminals C4 and C8, the SIM 2 and the R/W do not use a special terminal plate provided with eight or more terminals.

As shown in FIG. 12, eight contact pins 13 protrude from the back surface of the R/W terminal plate 12 so as to be in contact with the contact terminal plate 22 of the SIM 2.

FIG. 13 shows the SIM 2 installed in the SIM R/W 1. The SIM 2 is inserted along the case member 19 into a space under the R/W terminal plate 12. Therefore, a picture 27 of the user's face printed on the SIM 2 can be visually recognized if the case member 19 is made of a transparent resin.

As mentioned above, the noncontact communication function is blocked when the SIM R/W 1 is connected to a PC. The SIM R/W 1 can be utilized for payment at convenience stores and restaurants, passing ticket gates of transportation facilities and entering and exiting facilities by using a noncontact interface when the SIM R/W 1 is not connected to the PC.

The infrared transmitter-receiver 5a enables communication between terminal devices spaced apart by a distance longer than a maximum distance for noncontact communication conforming to ISO 14443.

The SIM R/W 1 can be directly connected to a PC and any additional R/W as peripheral equipment is not needed.

FIGS. 7(A) and 7(B) are plan views respectively showing the front surface provided with the contact terminal plate 22 of the SIM 2 and the back surface of the SIM 2 opposite the front surface.

As shown in FIG. 7(A), the SIM 2 has a base plate 21 having a long side L1 of 25 mm in length and a short side L2 of about 15 mm in length. The SIM 2 is a thin plate having a uniform thickness of about 1.0 mm or below, usually, 0.76 mm.

A contact/noncontact dual mode IC module is embedded in the back substrate of the contact terminal plate 22. One of the corners of the rectangular SIM is cut to form a bevel 23. The bevel 23 facilitates locating the SIM 2 relative to the SIM R/W 1 when the SIM 2 is inserted into the SIM R/W 1.

As shown in FIG. 7(B), the picture 27 of the user's face, the user's name 28 and a number 29 can be printed on the surface opposite the surface on which the contact terminal plate 22 is attached to facilitate identifying the user. If the case member 19 of the case 1a of the SIM R/W 1 is transparent, the user can be visually identified by the SIM 2 installed in the SIM R/W 1.

When the SIM 2 is an IC card capable of being loaded with multiple applications, the SIM 2 can be loaded with multiple applications, such as electronic money, an electronic ticket and a personnel ID card.

As obvious to those skilled in the art, the SIM R/W of the present invention described above is not limited to use in combination with the PC and can be used in combination with a device similar in function to the PC, such as a POS register or a digital camera.

The SIM R/W of the present invention can be used as a USB interface for the authentication of PC access privilege. The SIM R/W of the present invention provided with the ISO 14443 noncontact communication function can be used as an electronic ticket and as electronic money for various noncontact transactions including electronic settlement of an account.

Since the contents of the information held by the storage device of the SIM can be displayed by the liquid crystal display, work for displaying the contents of the information by the display of a PC or a special terminal device or work for printing out the contents of the information can be omitted.

Third Embodiment

A UIM adapter (SIM R/W) 101 in a third embodiment according to the present invention will be described with reference to the accompanying drawings.

Figure 14:
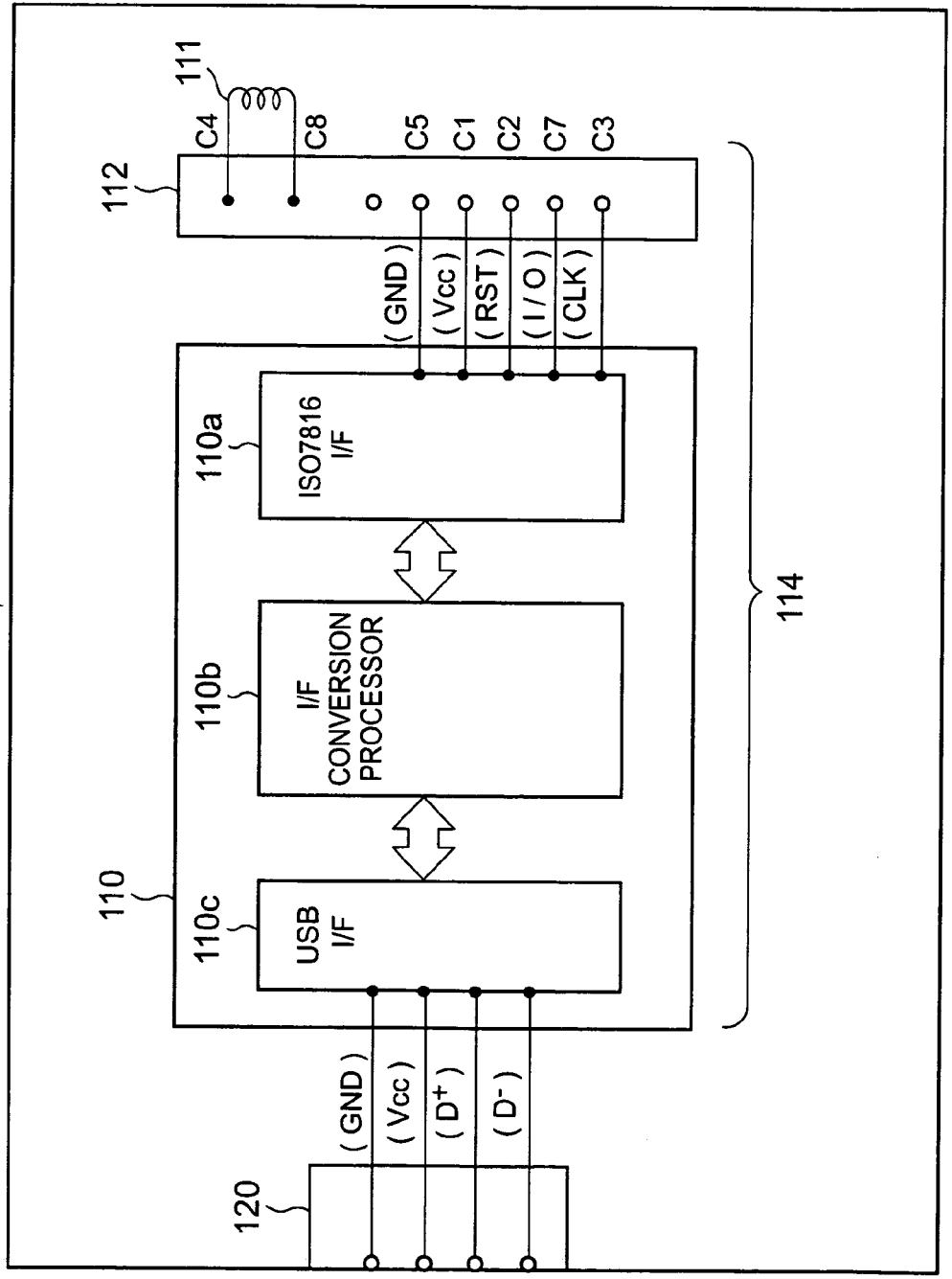
FIG. 14 is a block diagram of a UIM adapter in a third embodiment according to the present invention.
Figure 15:
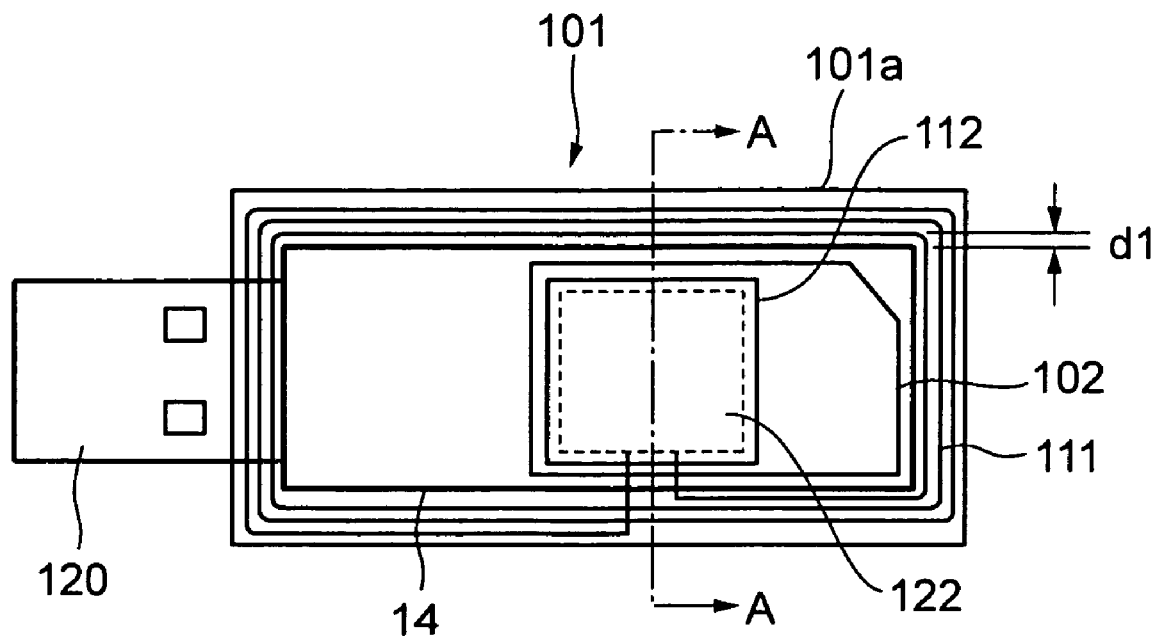
FIG. 15 is a plan view of a coil antenna.
Figure 16:
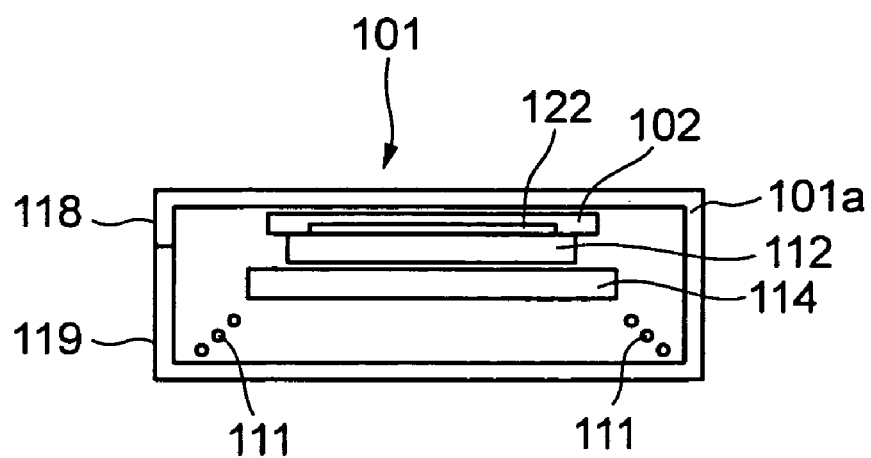
FIG. 16 is a sectional view taken on the line A-A in FIG. 15.
Figure 17:
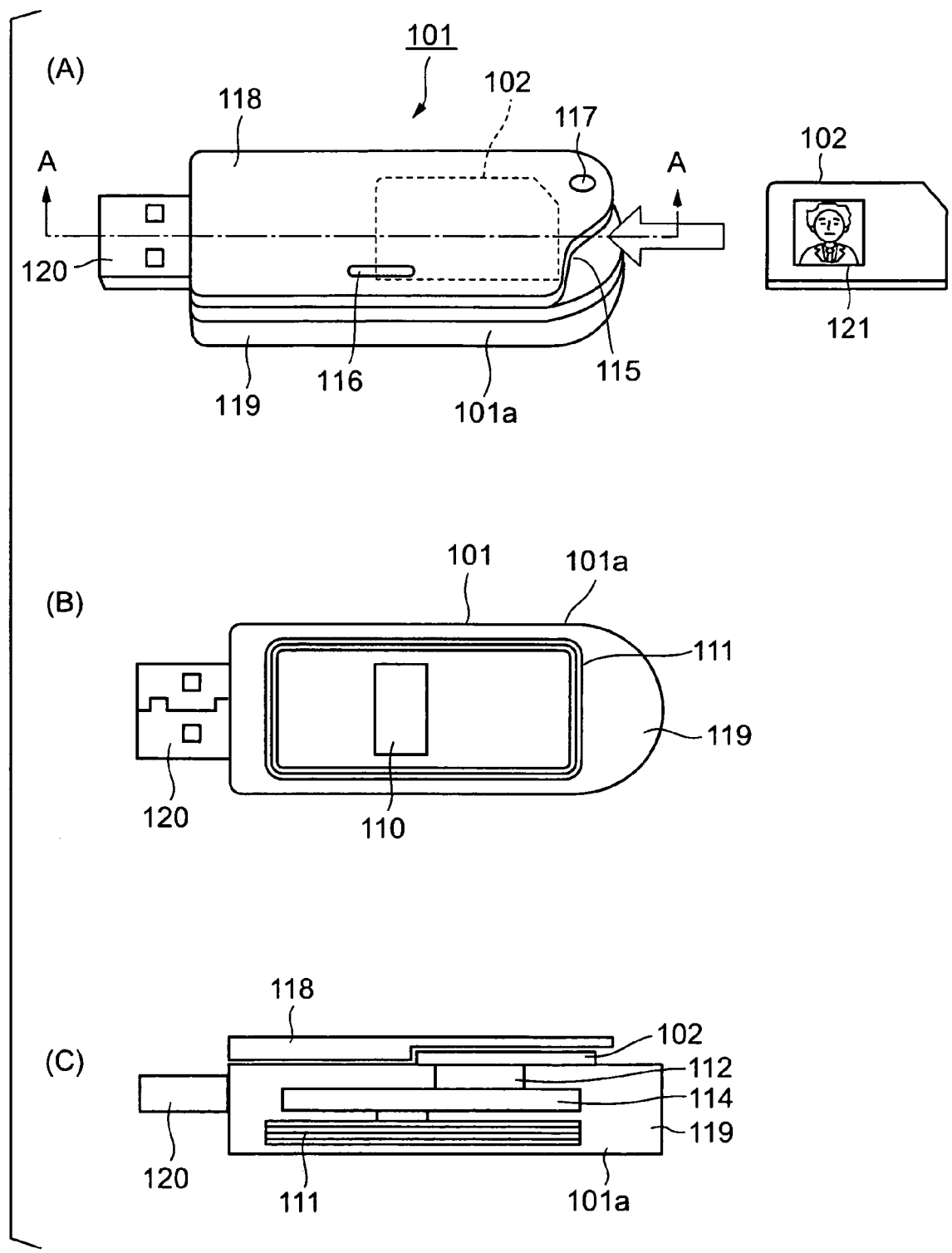
FIG. 17 is a full view of a UIM adapter in an example.
Figure 18:
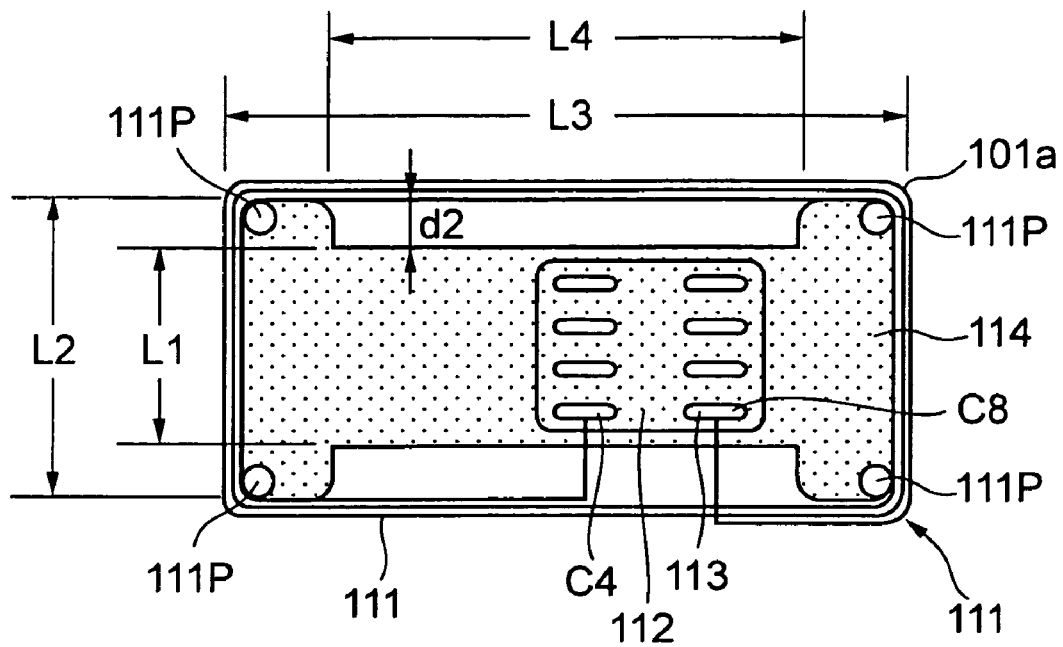
FIG. 18 is a plan view of a wiring board and a coil antenna included in the UIM adapter in the third embodiment.
Figure 19:
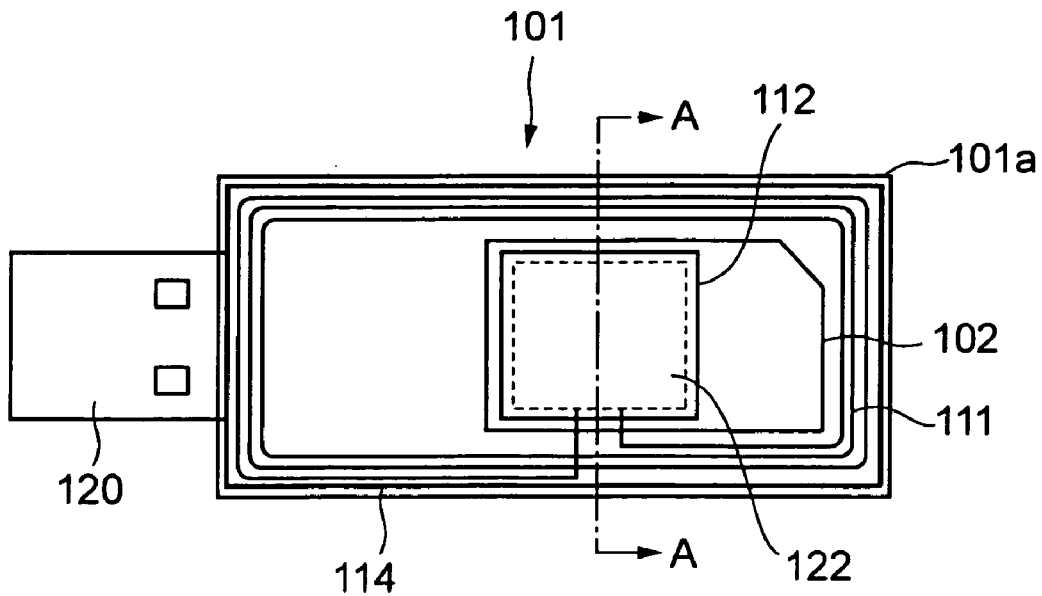
FIG. 19 is a plan view of a coil antenna in a comparative example.

FIG. 14 is a block diagram of the UIM adapter 101, FIG. 15 is a plan view of a coil antenna, FIG. 16 is a sectional view taken on the line A-A in FIG. 15, FIG. 17 is a perspective view of the UIM adapter 101, FIG. 18 is a plan view of a wiring board and the coil antenna and FIG. 19 is a plan view of a conventional coil antenna.

A UIM (SIM) 102 can be removably inserted into the UIM adapter 101. The UIM adapter 101 includes a case 101a, a terminal plate 112 placed in the case 101a, to which the UIM 102 is connected, a coil antenna 111 placed in the case 101a and connected to the terminal plate 112, and an IC chip 110 placed in the case 101a. A liquid crystal display 4 (FIG. 2) is attached to the case 101a. The liquid crystal display 4 is controlled by the IC chip 110.

As shown in FIG. 14, the UIM adapter 101 is provided with a wiring board 114, a contact terminal plate 12 held on the wiring board 114, and the coil antenna 111 formed around the wiring board 114. As shown in FIG. 14, an I/F conversion IC chip (interface conversion IC chip) 110 and a USB connector 120 are placed in the case 101a.

The terminal plate 112 connected to the UIM 102 has terminals C4 and C8. The coil antenna 111 and the coil antenna of the UIM 102 (only the coil antenna 111 when the UIM is not provided with an antenna) are connected to the terminals C4 and C8. An interface conforming to ISO 7816 and included in the I/F conversion IC chip 110 is connected to five terminals C5, C1, C2, C7 and C3 of the terminal plate 112 connected to the UIM 102.

The I/F conversion IC chip 110 converts signals provided by the UIM 102 into signals of a format suitable for transmission through the USB connector 120 according to a protocol and a format. The I/F conversion IC chip 110 is provided with an ISO7816 interface 110a, an I/F conversion processor 110b and a USB I/F 110c.

The IF conversion IC chip 110 and the contact terminal plate 112 are mounted on the wiring board 114.

The I/F conversion IC chip 110 and the USB connector 120 are not indispensable components of the UIM adapter 101. The contact terminal plate 112, the wiring board 114 and the coil antenna 111 are essential components of the UIM adapter 101.

Referring to FIG. 15 showing the antennal coil 111 in a plan view, the coil antenna 111 has, for example, several coils of a fine copper wire. The coil antenna 111 is formed around the wiring board 114 and the contact terminal plate 112. Preferably, the coil antenna 111 has a rectangular shape to place the coil antenna 111 in the case 101a of the rectangular UIM adapter 101. The coil antenna 111 may be formed in a shape conforming to the shape of the case 101a of the UIM adapter 101 and the arrangement of components in the case 101a.

It is known empirically that performance of the coil antenna 111 formed by coiling a copper wire of a diameter between 0.28 and 0.30 mm is satisfactory. A suitable number of turns of the copper wire of the coil antenna 111 is on the order of eight. If an antenna of a size suitable for forming the UIM adapter 101 has more than eight turns of a copper wire, resonance frequency is low and communication is impossible.

As shown in FIG. 15, the coil antenna 111 is formed such that a major part of the coil antenna 111 lies in an area outside an area corresponding to the wiring board 114 in a plane containing the wiring board 114 and the contact terminal plate 112. Thus most part of the coil antenna 111 does not overlap the wiring board 14. Preferably, the coil antenna 111 is formed so that the coil antenna 111 is three-dimensionally separated from the wiring board 114 and the contact terminal plate 112 by fixed spaces.

Referring to FIG. 16, the coil antenna 111 is placed in the case 101a having a cover member 118 and a case member 119. As shown in FIG. 16, the coil antenna 111 is disposed in a space between the wiring board 114 and the case member 119. The coil antenna 111 needs only to be separated from the wiring board 114 by a fixed space and does not necessarily need to be disposed under the wiring board 114.

Although the turns of the coil antenna 111 are separated from each other in FIGS. 15 and 16 for the sake of convenience, actually, the turns of the coil antenna 111 are arranged horizontally or vertically contiguously. Since the coil antenna 111 is formed by coiling a covered copper wire, the turns of the coil antenna 111 are not short-circuited.

In the UIM adapter 101 shown in FIG. 14, the coil antenna 11 cannot be formed so that the entire coil antenna 111 does not overlap the USB connector 120 when signals provided by the UIM 102 are given to the USB connector 120 because the coil antenna 111 passes the USB connector. However, it is confirmed that the UIM adapter 101 is able to exercise a predetermined noncontact communication effect when at least 50% or above of the length of the coil antenna 111 is separated from the wiring board 114 and the USB connector 120.

Although the effect of the UIM adapter 101 is satisfactory when the distance d1 (FIG. 15) between the coil antenna 111 and the wiring board 114 and the distance d1 between the coil antenna 111 and the contact terminal plate 112 are 0.2 mm or above, it is desirable that the distance d1 is between about 0.5 and about 3.0 mm to ensure satisfactory effect. Although the distance d1 may be greater than 3.0 mm, communication distance is rarely greater than that and the size of the UIM adapter is large if the distance d1 is greater than 3.0 mm. The vertical distance between the coil antenna 111 and the wiring board 114 and the vertical distance between the coil antenna 111 and the contact terminal plate 112 are between about 0.5 and about 3.0 mm.

Preferably, antenna support members or antenna suspending members are disposed in corners of the case 101a to hold the coil antenna 111 apart from the wiring board 114 and the contact terminal plate 112. The antenna support members or the antenna suspending members may be bars or protrusions made of a plastic material.

If the wiring board 114 and the contact terminal plate 112 are made of perfectly dielectric plastic materials, influences of the wiring board 114 and the contact terminal plate 112 on the coil antenna 111 cannot be clearly explained. It is inferred that such an effect is produced because the influences of the wiring materials and metal parts of the wiring board 114 and the contact terminal plate 112 on intercepting electromagnetic waves to be received by the coil antenna 111 can be minimized.

Examples, which will be described later, show that communication distance increases greatly when the antenna is spaced a predetermined distance apart from the wiring board and the contact terminal plate.

As shown in FIG. 14, the terminals C5 (GND), C1 ($V_{cc}$), C2 (RST), C7 (I/O) and C3 (CLK) are connected to the USB/ISO7816 conversion IC chip 110. The terminals GND, $V_{cc}$, D+ and D− of the IC chip 110 are connected to the USB connector 120.

A conventional UIM adapter is provided with an IC chip having a USB function, and the USB (D+) and USB (D−) use the terminals C4 and C8, respectively. Since the UIM adapter 101 shown in FIG. 14 is provided with the USB/ISO7816 conversion IC chip 110, a dual IC module having a conventional function can be used.

Since the terminals C4 and C8 are connected to the coil antenna 111, the UIM 102 does not need to be provided with a special terminal plate provided with eight or more terminals.

The noncontact communication function is blocked while the USB connector 120 is connected to a PC. The UIM adapter 101 can be utilized for managing payment at convenience stores and restaurants, passing ticket gates of transportation facilities and entering and exiting facilities by using a noncontact interface when the UIM adapter 101 is not connected to a PC.

The UIM 102 of the UIM adapter 101 is provide with a contact interface specified in ISO 7816-2 and ISO 7816-3, and a noncontact interface specified in ISO 14443. A contact/noncontact dual mode IC module is attached to the back surface of the contact terminal plate of the UIM 102. The UIM 102 has a shape specified in GSM (Global System for Mobile communication) and 3GPP (3rd Generation Partnership Project). The UIM 102 has a substrate having a long side of 25 mm in length and a short side of 15 mm in length. The UIM 102 is a thin plate having a uniform thickness of 0.76 mm.

EXAMPLE 1

A UIM adapter 101 in Example 1 as shown in FIG. 17 provided with a wiring board and a coil antenna shown in FIG. 18 was fabricated.

FIGS. 17(A), 17(B) and 17(C) are a perspective view, a plan view and a sectional view taken on the line A-A in FIG. 17(A), respectively, of the UIM adapter 101 in Example 1, and FIG. 18 is a plan view of the wiring board and the coil antenna included in the UIM adapter 101 in Example 1.

Although any one of the surfaces of the UIM adapter 101 may be an upper surface, a surface through which a picture 121 of the user's face can be seen is an upper surface in FIG. 17.

The UIM adapter 101 shown in FIG. 17 had a case 101a having a cover member 118 and a case member 119. The cover member 118 and the case member 119 were made of a polycarbonate resin by injection molding. A contact terminal plate 112, a wiring board 114 and a coil antenna 111 were placed in the case member 119. The thickness of a part of the cover member 118 between a UIM insertion opening 115 and a stopping shoulder for stopping the UIM 102 from being inserted into the case 101a was reduced to define a space in which the UIM 102 is held fixedly. A part of the cover member 118 corresponding to the UIM 102 inserted into the space in the case 101a was transparent to enable the recognition of the picture 121 of the user's face printed on the UIM 102. Parts of the cover member 118 excluding the transparent part were semitransparent. The cover member 118 was provided with a UIM ejecting slide 116 and a key holding opening 117.

The USB connector 120 was combined with the case 101a and the UIM insertion opening 115 was formed such that the USB connector 120 could be inserted into an external device and the UIM 102 could be inserted into the case 101a in the same direction. The UIM 102 inserted through the UIM insertion opening 115 formed in a right end part of the case 101a into the case 101a was fixedly held in a space over the upper surface of the contact terminal plate 112.

The case 101a excluding the USB connector 120 was 55 mm in length and 21 mm in width. A middle part of the case 101a was 11 mm in thickness. The length of a part of the USB connector 120 projecting from the case 101a was 12 mm.

Referring to FIGS. 17(A), 17(B) and 17(C), the contact terminal plate 112 was disposed above the wiring board 114, and the coil antenna 111 and a USB/ISO7816 conversion IC chip 110 were disposed below the wiring board 114. The contact terminal plate 112 had a substrate of 2.6 mm in thickness made of an ABS resin and was provided with eight gold-plated contact pins 113 (FIG. 18). The eight terminals of the contact terminal plate of the UIM 102 were brought into contact with the contact pins 113, respectively. The contact pins 113 were connected by wiring lines to the I/f IC chip 110 or the coil antenna 111.

As shown in FIG. 18, the wiring board 114 was surrounded by the coil antenna 111 having the shape of a rectangular ring. The opposite ends of the coil antenna 111 were connected to the terminals C4 and C8 of the contact terminal plate 112, respectively so that the coil antenna 111 could be connected to the UIM 102.

The coil antenna 111 was formed by coiling a 0.3 mm diameter covered copper wire. The coil antenna 111 had eight turns of the copper wire. The coil antenna 111 had the shape of a flat, rectangular ring of about 38 mm×about 16 mm.

The wiring board 114 was formed by processing a 0.8 mm thick base plate of a shape shown in FIG. 18 made of an epoxy resin. The base plate had the shape of a paper reel having four bulged corner parts. Four poles 111P of 2.5 mm in height and 1.0 mm in diameter made of a polycarbonate resin were set up on the case member 119 so as to correspond to the bulged corner parts of the wiring board 114, respectively. The coil antenna 111 was turned through an angle of 90° around the four poles 111P.

The width L1 of a narrow part of the wiring board 114 was 11 mm, the distance L2 between the outer surfaces of the two poles 111P was 14 mm, the distance L3 between the outer surfaces f the two poles 111P was 37 mm and the length L4 of the narrow part of the wiring board 114 was 25 mm.

Theoretically a space d2 of 1.5 mm was formed between the long side of the wiring board 114 and the long side of the coil antenna 111 extending along the long side of the wiring board 114. The length of parts, which did not overlap the wiring board 114, of the coil antenna 111 was 500% or above of the overall length of the coil antenna 111.

The length of the wiring board 114 was 35 mm. The USB connector 120 was connected to one end of the wiring board 114. The width of longitudinal end parts of the wiring board corresponding to the USB connector 120 and the insertion opening 115 through which the UIM 102 is inserted into the case 101a was not reduced. The sides of the coil antenna 111 extended close to the outside of the longitudinal end parts of the wiring board 114.

The UIM 102 was provided with a contact/noncontact IC module and was not provided with any coil antenna. The contact/noncontact IC module of the UIM 102 included IC chips A and B respectively having different characteristics.

The IC chips A and B were manufactured by different manufacturers, respectively. The IC chips A and B had different electric characteristics, respectively. More specifically, the IC chips A and B were different from each other in capacitance between the terminals C4 and C8, and power necessary for driving the reader/writer.

EXAMPLE 2

A UIM adapter 101 in Example 2 was fabricated. The configuration of the UIM adapter 101 in Example 2 was the same as that of the UIM adapter 101 in Example 1, except that Example 2 was provided with a wiring board 114 different from that of the UIM adapter 101 in Example 1.

The wiring board 114 of the UIM adapter 101 in Example 2 was the same as the wiring board 114 of the UIM 101 in Example 1 in thickness, material, poles 111P, the diameter of a covered copper wires forming a coil antenna 111 and the number of turns of the coil antenna 111.

The width L1 of a narrow part of the wiring board 114 was 13 mm, the distance L2 between the outer surfaces of the two poles 111P was 14 mm, the distance L3 between the outer surfaces f the two poles 111P was 37 mm and the length L4 of the narrow part of the wiring board 114 was 25 mm.

Theoretically a space d2 of 0.5 mm was formed between the long side of the wiring board 114 and the long side of the coil antenna 111 extending along the long side of the wiring board 114. The length of parts, which did not overlap the wiring board 114, of the coil antenna 111 was 50% or above of the overall length of the coil antenna 111.

A UIM 102 was provided with a contact/noncontact IC module and was not provided with any coil antenna. The contact/noncontact IC module of the UIM 102 included, similarly to the UIM 102 of the UIM adapter 101 in Example 1, IC chips A and B respectively having different characteristics.

COMPARATIVE EXAMPLE

A UIM adapter 101 in Comparative example had a case 101a identical with that of the UIM adapter 101 in foregoing Example 1. The case 101a had a cover member 118 and a case member 119 formed by molding a resin. The UIM adapter 101 was provided with a wiring board 114 and a contact terminal plate 112 respectively similar to those of the UIM adapter in the foregoing example. The wiring board 114 had a rectangular shape of 14 mm×35 mm in size. Four poles of 1.5 mm in height and 1.0 mm in diameter made of a polycarbonate resin were set up on the case member 119 so as to correspond to the four corners of the wiring board 114, respectively. A coil antenna 111 was turned through an angle of 90° around the four poles. A covered copper wire of 0.3 mm in diameter was wound round the poles to form the coil antenna 111. The coil antenna 111 had eight turns of the covered copper wire. The sides of the coil antenna coincided substantially with the sides of the wiring board 114, respectively.

Figure 20:
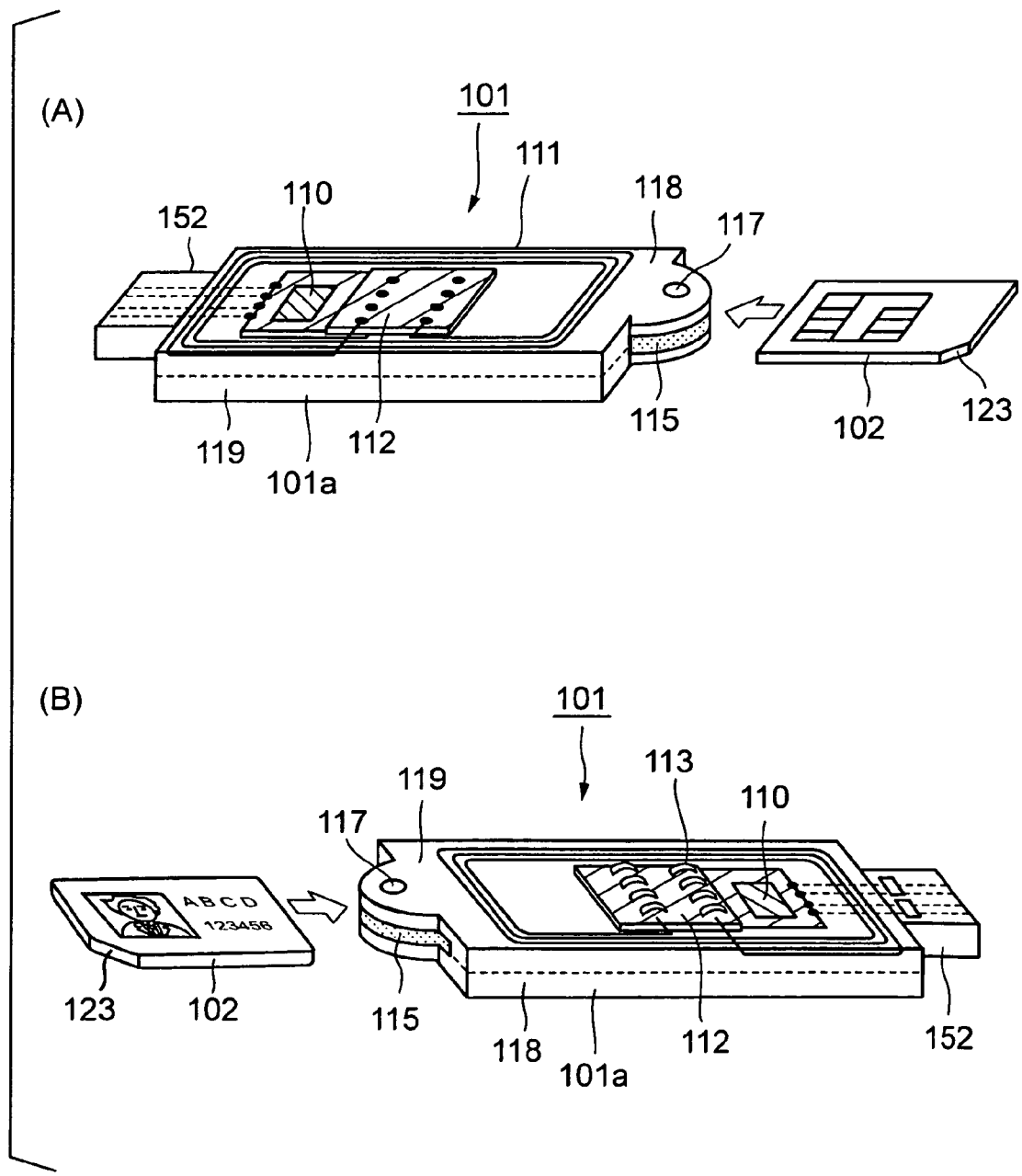
FIGS. 20(A) and 20(B) are perspective views of SIM holders in comparative examples.

The UIM adapter 101 was provided with a UIM 102 identical with those of the UIM adapters in Examples 1 and 2; the UIM 102 was provided with two types of IC chips A and B (FIGS. 19 and 20).

Table 1 comparatively shows noncontact communication distances at which the UIM adapters in Examples 1 and 2 and Comparative example could achieve noncontact communication, respectively. Table 2 shows improvement ratios at which the UIM adapters in Examples 1 and 2 increased the longest noncontact communication. Values shown in Table 2 are the longest noncontact distances from a noncontact R/W (PR-100PK, Denso Wave) at which the UIM adapters in the examples and the comparative example could achieve noncontact communication with the noncontact R/W, respectively.

As obvious from Table 1, the noncontact communication distances at which noncontact communication could be achieved by using the IC chips A and B are longer than those at which non contact communication could be achieved by the UIM adapter in Comparative example.

As obvious from Table 2, the UIM adapter 101 in Example 1 could increase the longest noncontact communication distance at which the UIM adapter in Comparative example could achieve noncontact communication by 70% by using the IC chip A and could increase the same by 45% by using the IC chip B. The UIM adapter 101 in Example 2 could increase the longest noncontact communication distance at which the UIM adapter in Comparative example could achieve noncontact communication by 41% by using the IC chip A and could increase the same by 21% by using the IC chip B.

The improvement ratio is calculated by using:

(Improvement ratio)=[{(Communication distance at which the example could achieve noncontact communication)−(Communication distance at which the comparative example could achieve noncontact communication)}/(Communication distance at which the comparative example could achieve noncontact communication)]×100 (%)

TABLE 1

|  | Example 1 | Example 2 | comparative example |
|---|---|---|---|
| IC chip A | 29 mm | 24 mm | 17 mm |
| IC chip B | 33 mm | 28 mm | 23 mm |

TABLE 2

|  | Example 1 | Example 2 |
|---|---|---|
| IC chip A | 70% | 41% |
| IC chip B | 43% | 21% |

The UIM adapter of the present invention has the noncontact communication function and is capable of achieving noncontact communication with an external device sufficiently distant therefrom. Therefore, the UIM adapter of the present invention can be used as an electronic ticket and as electronic money for various noncontact mail-order transactions, such as settlement of an account.

Since the coil antenna of the UIM adapter of the present invention is formed so as to surround the wiring board and to be spaced apart from the sides of the wiring board by spaces, electromagnetic waves to be received by the coil antenna are not intercepted by the wiring board and the UIM adapter is able to communicated with an external device at a long distance therefrom.

Fourth Embodiment

A noncontact communication device in a fourth embodiment according to the present invention will be described with reference to the accompanying drawings.

Figure 21:
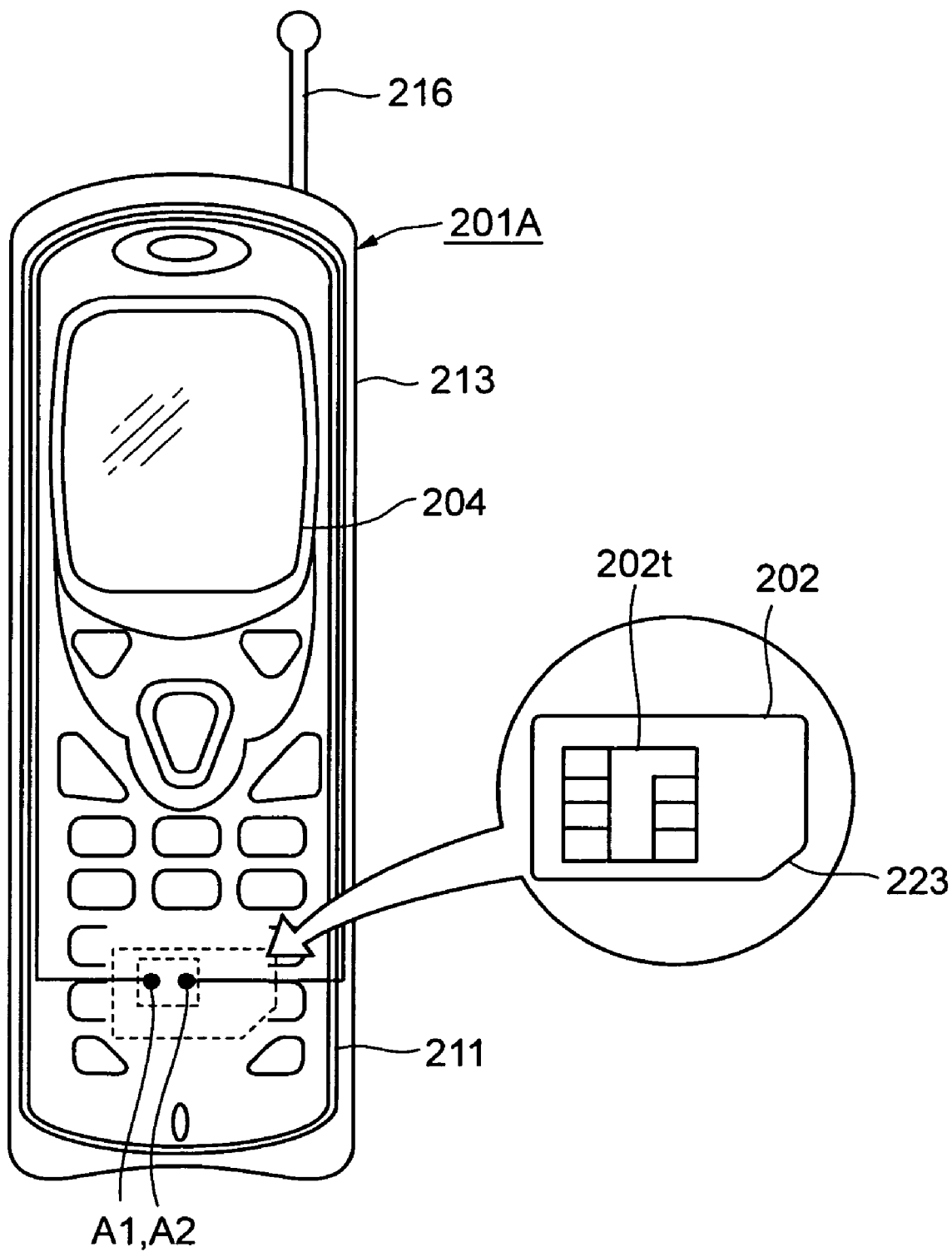
FIG. 21 is a plan view of a cellular phone in an example of a noncontact communication device in a fourth embodiment according to the present invention.
Figure 22:
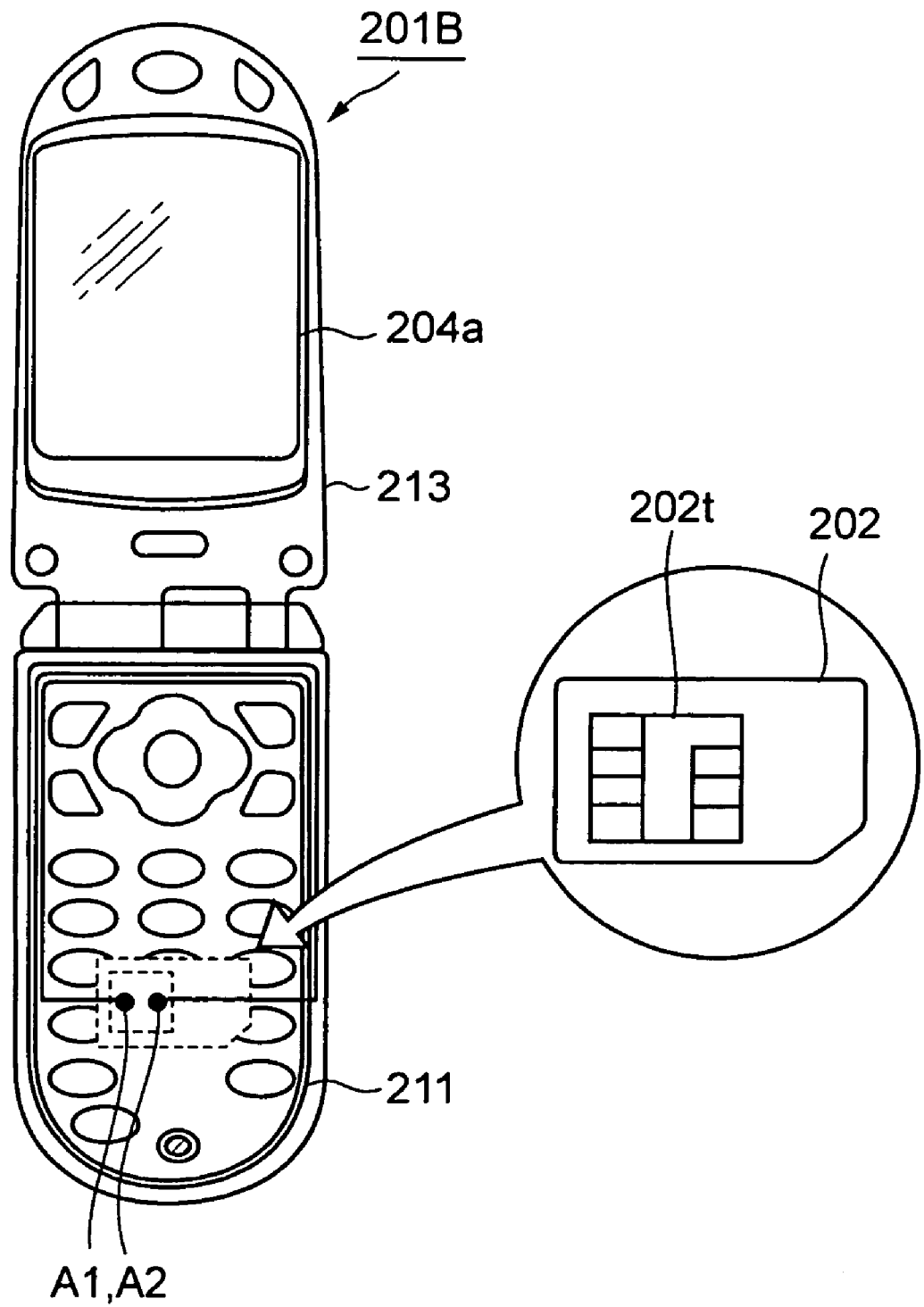
FIG. 22 is a plan view of a foldable cellular phone capable of being folded in two in another example of the noncontact communication device in the fourth embodiment.
Figure 23:
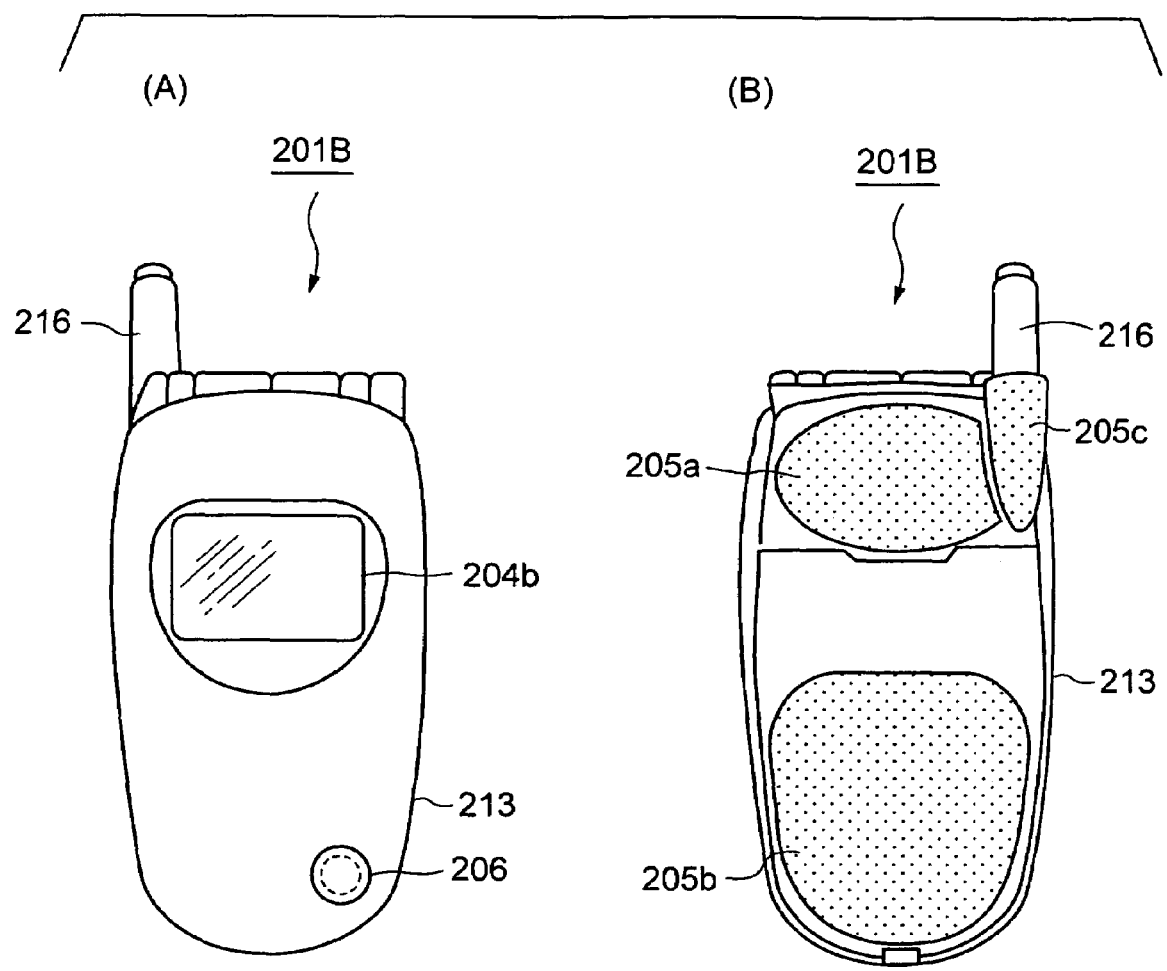
FIGS. 23(A) and 23(B) are plan views of the folded foldable noncontact communication device.
Figure 24:
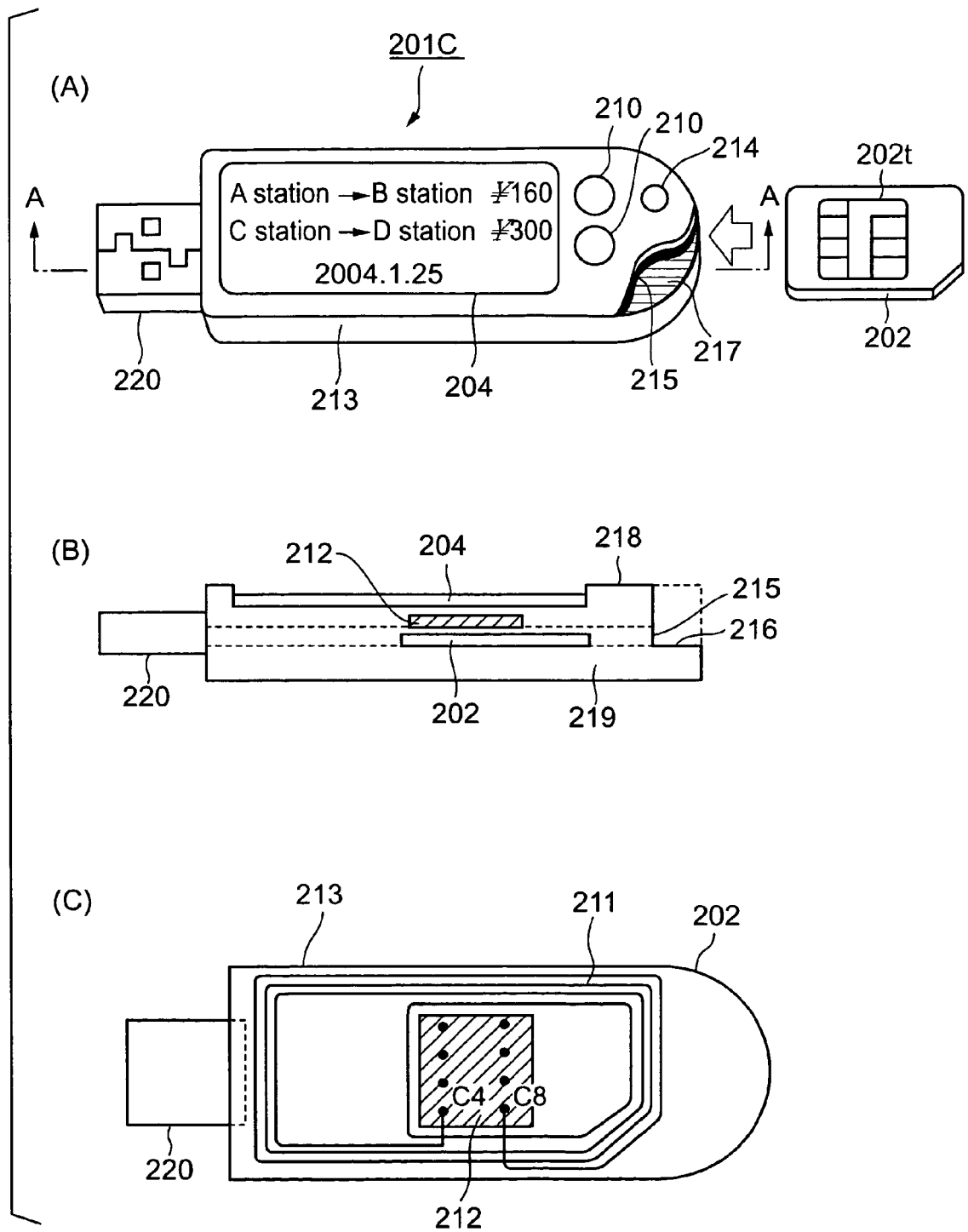
FIGS. 24(A), 24(B) and 24(C) are a perspective view, a side elevation and a plan view, respectively, of a SIM reader/writer in a third example of the noncontact communication device.
Figure 25:
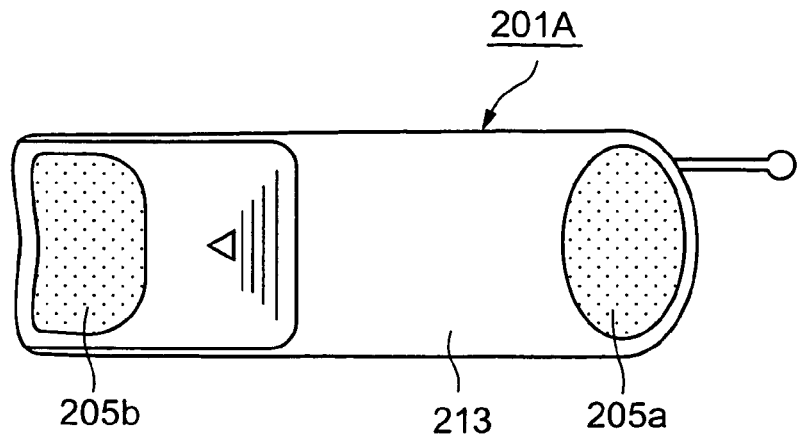
FIG. 25 is a plan view of the noncontact communication device shown in FIG. 21, showing a back surface opposite a front surface having a display function.
Figure 26:
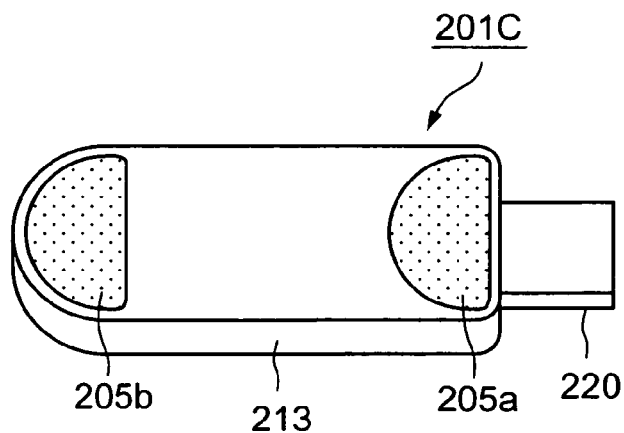
FIG. 26 is a perspective view of the noncontact communication device shown in FIG. 24, showing a back surface opposite a front surface having a display function.
Figure 27:
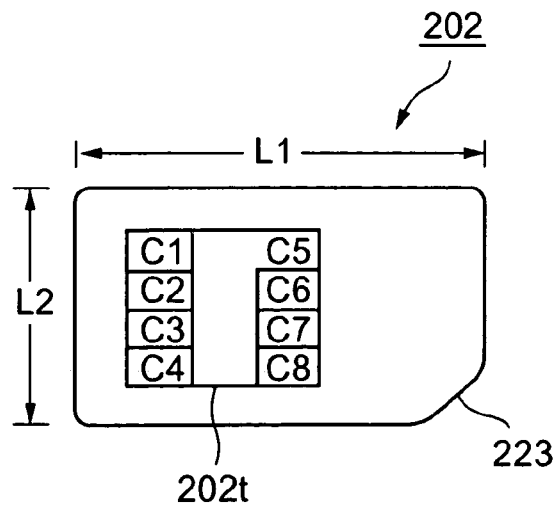
FIG. 27 is a plan view of a SIM.
Figure 28:
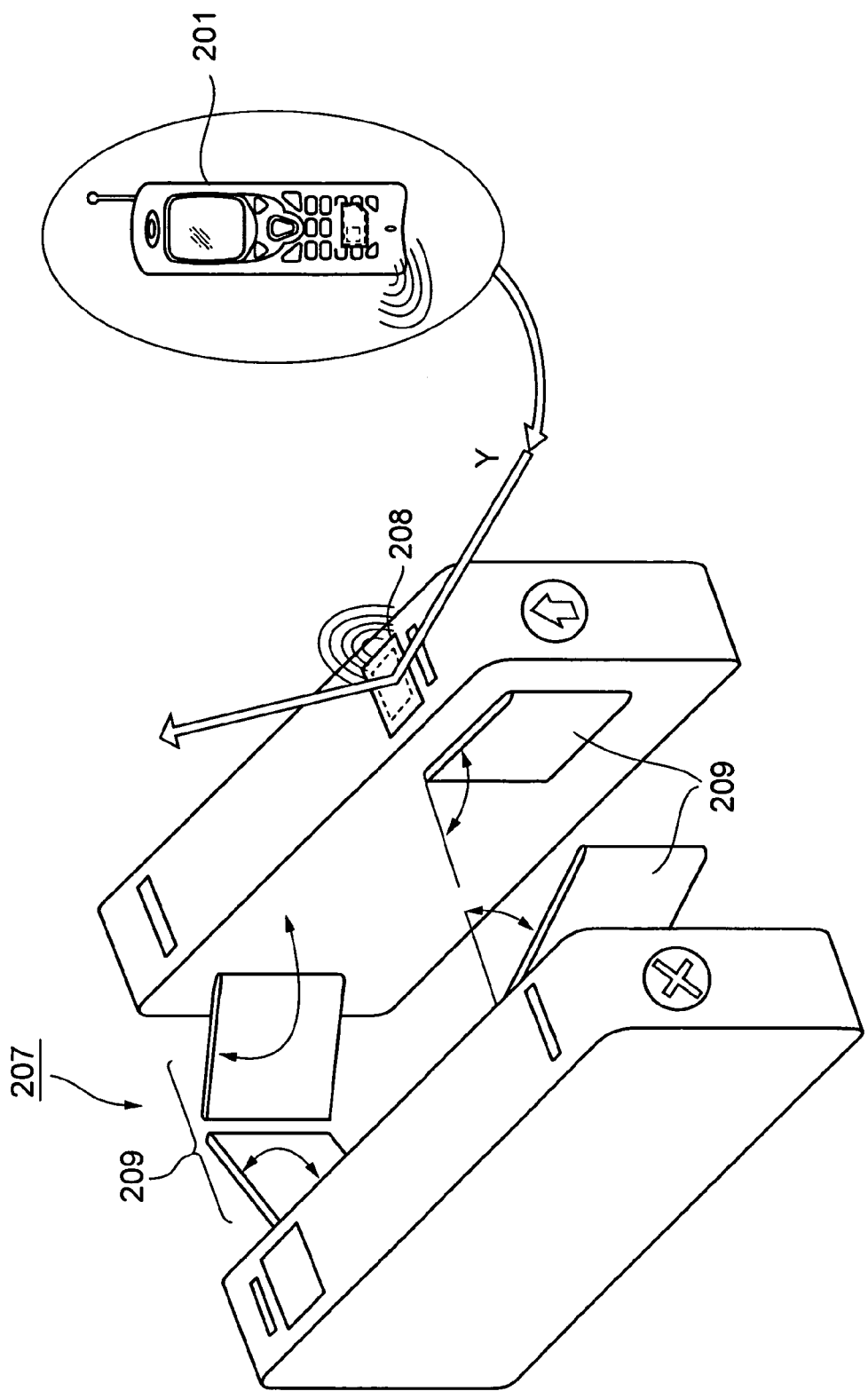
FIG. 28 is a perspective view of assistance in explaining a mode of using a noncontact communication device to operate a ticket gate.

FIG. 21 is a plan view of a cellular phone in an example of a noncontact communication device in the fourth embodiment, FIG. 22 is a plan view of a foldable cellular phone capable of being folded in two in another example of the noncontact communication device in the fourth embodiment, FIGS. 23(A) and 23(B) are plan views of the folded foldable noncontact communication device, FIGS. 24(A), 24(B) and 24(C) are a perspective view, a side elevation and a plan view, respectively, of a SIM reader/writer in a third example of the noncontact communication device, FIG. 25 is a plan view of the noncontact communication device shown in FIG. 21, showing a back surface opposite a front surface having a display function, FIG. 26 is a perspective view of the noncontact communication device shown in FIG. 24, showing a back surface opposite a front surface having a display function, FIG. 27 is a plan view of a SIM, and FIG. 28 is a perspective view of assistance in explaining a mode of using a noncontact communication device to operate a ticket gate.

A portable noncontact communication device 201A of the present invention has the shape of an ordinary cellular phone as shown in FIG. 21. A contact/noncontact SIM 202 can be detachable combined with the portable noncontact communication device 201A. The noncontact communication device 201A has a case 213 and a coil antenna 211 placed in the case 213. The SIM 202 is inserted into the case 213 so as to be connected to the coil antenna 211.

The case 213 of the noncontact communication device 201A has a display surface 204. Preferably, the display surface 204 is the surface of the screen of, for example, a color liquid crystal display. A key pad and selector buttons are arranged in a plane containing the display surface 204. A power switch can be closed or opened, desired images can be displayed, desired operation can be selected and characters can be entered by operating the key pad and the selector buttons. Those functions of the portable noncontact communication device 201a are similar to those of the cellular phone.

As shown in FIG. 21, the coil antenna 211 may be placed in a peripheral part of the interior of the case 213 or may be placed so as to surround the SIM 202 inserted into the case 213. Opposite ends of the coil antenna 211 are connected to noncontact communication terminals A1 and A2 of the SIM 202. The coil antenna 211 may be connected to the RFU terminals C4 and C8 of the contact terminal plate 202t of the SIM 202. The coil antenna 211 is used for short-distance noncontact communication using an electromagnetic wave of a frequency in a 13.56 MHz frequency band different from a frequency band allocated to ordinary radio communication by cellular phones.

The noncontact communication is used for fare adjustment and business account settlement. A controlling IC chip included in the SIM 202 updates the contents of a storage device on the basis of an amount of money paid to settle an account.

A rod antenna 216 is attached to the case 213. The rod antenna 216 is used for radio telephony. The rod antenna 216 is included in an ordinary cellular phone and is not used for noncontact communication by the SIM 202.

The case 213 of the noncontact communication device 201A may be foldable in two on a hinge formed in a part of the case 213 between the display surface 204 and the key pad such that the display surface 204 faces the key pad.

FIG. 22 is a foldable cellular phone capable of being folded in two in an example of another noncontact communication device 201B of the present invention. A coil antenna 211 is placed in a first half part, provided with a key pad and selector buttons, of a case 213. The opposite ends of the coil antenna 211 can be connected to noncontact communication terminals A1 and A2 of a SIM 202.

The contact/noncontact SIM 202 can be detachably combined with the noncontact communication device 201B. The noncontact communication device 201B has the case 213 and the coil antenna 211 placed in the case 213. The SIM 202 is connected to the coil antenna 211.

FIG. 23 shows the foldable noncontact communication device 201B folded in two.

Some foldable cellular phone is provided with two function display surfaces. When the foldable cellular phone is provided with a main display surface 204a and an auxiliary display surface 204b, in most cases, the foldable cellular phone is folded so that a surface provided with a key pad and selector buttons lies inside, the main display surface 204a is formed in the surface lying inside and the small auxiliary display surface 204b is formed in a surface lying outside opposite t the surface lying inside. If the case 213 is provided with a photographic lens 206, the photographic lens 206 is attached to the outside surface in which the auxiliary display surface 204b is formed.

Other functions of the noncontact communication device 201B, similarly to those of the noncontact communication device 201A shown in FIG. 21, are the same as those of ordinary cellular phones.

FIG. 24 shows a third example of the noncontact communication device 201C. FIG. 24(A) is a perspective view of the noncontact communication device 201C, FIG. 24(B) is a sectional view taken on the line A-A in FIG. 24(A) and FIG. 24(C) is a plan view showing the interior of the noncontact communication device 201C with a contact/noncontact SIM 202.

The noncontact communication device 201C has a case 213 and a liquid crystal display 204 attached to the case 201C. The liquid crystal display 204 can display a fair and such. The case 213 is provided with buttons 210. The buttons 210 are operated to close or open the power switch and to select a desired displayed function and a desired operation. A pilot LED lamp is placed on the case 213 to indicate that components of the noncontact communication device 201C are connected to a power supply.

The noncontact communication device 201C is provided with a USB connector 220.

Thus the noncontact communication device 201C can be connected to a PC or a USB device. When the noncontact communication device 201C is connected to a PC, the PC exchanges information with the SIM 202 to authenticate the user for information security.

In most cases, the case 213 of the noncontact communication device 201C has a cover member 218 and a case member 219 as shown in FIG. 24(B). An insertion opening 215 is formed between the cover member 218 and the case member 219. The SIM 202 is inserted through the insertion opening 215 into the case 213. A step 216 formed near the insertion opening 215 facilitate the insertion of the SIM 202 into the case 213.

A terminal plate 212 is placed in the case 213. The SIM 202 provided with a contact terminal plate 202t is held under the terminal plate 212 with the contact terminal plate 202t in contact with contact pins, not shown, attached to the terminal plate 212.

A coil antenna 211 formed by coiling a wire is placed in the case 213 of the noncontact communication device 201C. The opposite ends of the coil terminal 211 are connected to terminals C4 and C8, respectively. A noncontact communication device of the SIM 202 is connected to the coil antenna 211 placed in the case 213 by the contact pins of the terminal plate 212. The coil antenna 211 can be connected to the terminals C4 and C8, namely, the RFU terminals of the contact terminal plate 202t of the SIM 202 for noncontact communication with an external device.

Noncontact communication uses an electromagnetic wave of a frequency in a 13.56 MHz frequency band allocated to IC card communication conforming to ISO 14443. The noncontact communication is used for fare adjustment and business account settlement. A controlling IC chip included in the SIM 202 updates the contents of a storage device on the basis of an amount of money paid to settle an account.

As shown in FIGS. 25, 26 or 23(B), the noncontact communication device 201 is provided with cushiony members 205a and 205b on its back surface opposite its front surface in which the display surface 204 is placed. The cushiony members 205a and 205b are attached to the back surface opposite the front surface in which the display surface 204 is placed because it is usual to hold the noncontact communication device 201A, 201B and 201C with their display surfaces facing the user so that the back surfaces of the noncontact communication devices 201A, 201B and 201C can come into contact with a reader installed in a ticket gate.

Although it is preferable that the cushiony members 205a and 205b cover the back surface entirely, the cushiony members 205a and 205b may partially cover the back surface as shown in FIGS. 25 and 26. If the noncontact communication device is not foldable in two and the cushiony members 205a and 205b are attached to the back surface so as to cover the back surface partially, it is preferable to attach the cushiony members 205a and 205b to opposite longitudinal end parts of the case 213 so as to be contiguous with the end edges of the case 213, respectively, because either of the opposite longitudinal ends of the case 213 comes first into contact with the reader and the case 213 exerts a strong shock on the reader or receives a strong shock from the reader when the noncontact communication devices 201A, 201B and 201C are brought into contact with the reader.

When the noncontact communication device 201 is a foldable cellular phone having a case 213 having first and second half cases and foldable in two and an auxiliary display surface 204b of a liquid crystal display or the like is formed in the outside surface of the first half case, the cushiony members 205a and 205b are attached to the outside surface of the second half case. The cushiony members 205a and 205b are attached to the outside surface of the second half case because it is usual that a fare and transaction data can be displayed on the auxiliary display surface 204b and the noncontact communication device 201 is brought into contact with a receiver 8 installed in a ticket gate with the surface on which visual information is displayed facing the user. When the surface of the case is covered partially, it is preferable to attach a cushiony member 205c to a protruding part of the second half case in addition to attaching the cushiony members 205a and 205b to the opposite longitudinal end parts of the second half case. In the cellular phone 201B shown in FIG. 23(B), the cushiony member 205c is attached to the surface of an antennal support supporting the rod antenna 216.

There are not particular restrictions on the material of the cushiony members 205a, 205b and 205c, provided that the cushiony members 205a, 205b and 205c are slightly elastic and capable of withstanding an ordinary repetitive working condition. Styrene-butadiene rubber (SBR) is one of desirable materials. A SRB sheet having a uniform thickness and one surface coated with an adhesive may be attached to the case of the noncontact communication device.

Although the greater the thickness of the cushiony members 205a, 205b and 205c, the higher is the shock absorbing effect of the cushiony members 205a, 205b and 205c, the thickness is in the range of about 0.5 to about 5 mm to make the cushiony members 205a, 205b and 205c good to the touch. An optimum thickness is between about 0.8 and about 1.2 mm.

Another suitable material is a polyurethane resin. The back surface of the case may be covered entirely with a polyurethane resin film of a thickness on the order of 0.2 mm by spraying. Naturally, the thickness of the polyurethane resin film may be greater than 0.2 mm.

The case 213 of the cellular phone 201A is made of the ABS resin by injection molding and, in most cases, the case 213 is coated. The case 213 of the portable SIM R/W 201C is made, in most cases, of a polycarbonate resin, a polypropylene resin or a acrylic resin by injection molding.

FIG. 27 shows the SIM 202.

As shown in FIG. 27, the SIM 202 is a thin plate of a length L1 of 25 mm and a width L2 of about 15 mm having a uniform thickness of about 1.0 mm or below. One of the corners of the rectangular SIM 202 is cut to form a bevel 223. The bevel 223 serves for locating the SIM 202. The appearance of the SIM 202 is identical with those of general SIMs. A contact terminal plate 202t and an IC chip module are attached to the front and the back surface of the SIM 202, respectively.

The IC chip module has at least a noncontact communication function. Preferably, the IC chip module is capable of both a noncontact communication function and a contact communication function. The SIM 202 may be provided with a coil antenna. The size and position of the terminal plate conform to general IC card standards and GSM standards.

The surface of the contact terminal plate 202t of the SIM 202 has a terminal function conforming to ISO 7816 and has eight terminals C1 to C8 as shown in FIG. 27.

Thermoplastic resin terminals C1, C2, C3, C5, C6 and C7 are $V_{cc}$, RST, CLK, GND and $V_{pp}$ and I/O terminals, respectively. The terminals C4 and C8 are RFU terminals (reserve terminals). The coil antenna can be connected through the terminals C4 and C8 to the IC chip included in the SIM 202. The $V_{pp}$ terminal is a reserve terminal.

FIG. 28 is a perspective view of assistance in explaining a mode of using a noncontact communication device to operate a ticket gate.

A noncontact communication device 201 having the function of an IC card is brought into contact with a receiving unit 208 installed in a ticket gate 207 of transportation facilities in the direction of the arrow Y. Then, the receiving unit 208 of the ticket gate 207 receives an electromagnetic wave emitted by the noncontact communication device 201, and then a door 209 is opened or kept closed.

The surface of the receiving unit 208 is covered with a hard plastic plate. Damage in the hard plastic plate increases as the number of persons passing the ticket gate 207 increases. Therefore, it is preferable to protect the receiving unit 208 with a cushiony member.

The noncontact communication device 201 can be similarly used for operating the door of a building of a corporation and the entrance of facilities.

The case, which comes into contact with external devices, of the portable noncontact communication device of the present invention is partially or entirely covered with the cushiony member. Therefore, shocks exerted on the portable noncontact communication device can be mitigated and hence the breakage of the portable noncontact communication device and the external devices can be prevented even if the noncontact communication device needs to be brought into contact with the external devices.

Fifth Embodiment

Figure 34:
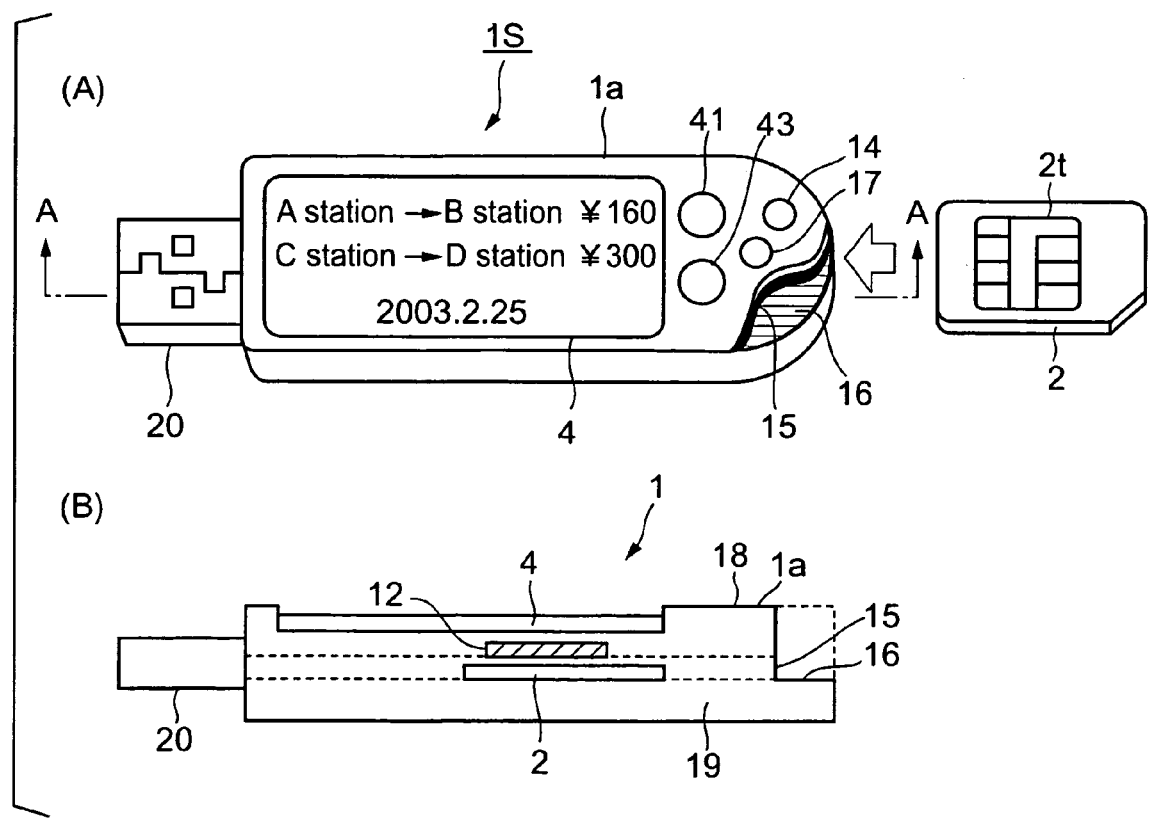
FIGS. 34(A) and 34(B) are a perspective view and a side elevation, respectively, of a SIM reader/writer with a liquid crystal display.

FIG. 34 shows a SIM R/W 1S in a fifth embodiment according to the present invention provided with a liquid crystal display 4 and capable of being loaded with a SIM 2. FIG. 34(A) is a perspective view of the SIM R/W is and FIG. 34(B) is a sectional view taken on the line A-A in FIG. 34(A).

As shown in FIG. 34(A), The SIM R/W 1S has a case 1a. The liquid crystal display 4 is attached to the case 1a to display various pieces of information stored in the SIM 2. A USB connector 20 projects from the left end of the case 1a. An insertion opening 15 is formed in the right end of the case 1a. The SIM 2 is inserted along a step 16 formed in the case 1a and through the insertion opening 15 into the case 1a. When a strap or the like is passed through a key holding hole 17 and is tied to the SIM R/W 1S, the SIM 2 is prevented from being dropped.

Access privilege to gain access to a PC or the like can be authenticated and data can be exchanged between the SIM R/W 15 and the PC or the like by inserting the USB connector 20 into the PC or the like after loading the SIM 2 into the SIM R/W 15.

A pilot LED lamp 14 indicates the connection of components of the SIM R/W 15 to a power supply. Switch buttons 41 and 43 are operated to close or open the power switch and to select a desired displayed function and a desired operation.

As shown in FIG. 34(B), the SIM 2 inserted into the case 1a through the insertion opening 15 formed in a right end part of the case 1a is held fixedly under a R/W terminal plate 12 placed in the case 1a. Usually, the case 1a of the SIM R/W 15 has a cover member 18 and a case member 19. A coil antenna 11 for noncontact communication and a battery 7 are held in the case 1a. The coil antenna 11 is connected through the R/W terminal plate 12 to the terminals Cr and C8 of a contact terminal plate 2t included in the SIM 2.

The SIM R/W provided with the liquid crystal display 4 will be described on an assumption that the SIM 2 is a UIM. The SIM R/W can be called a UIM R/W.

Figure 29:
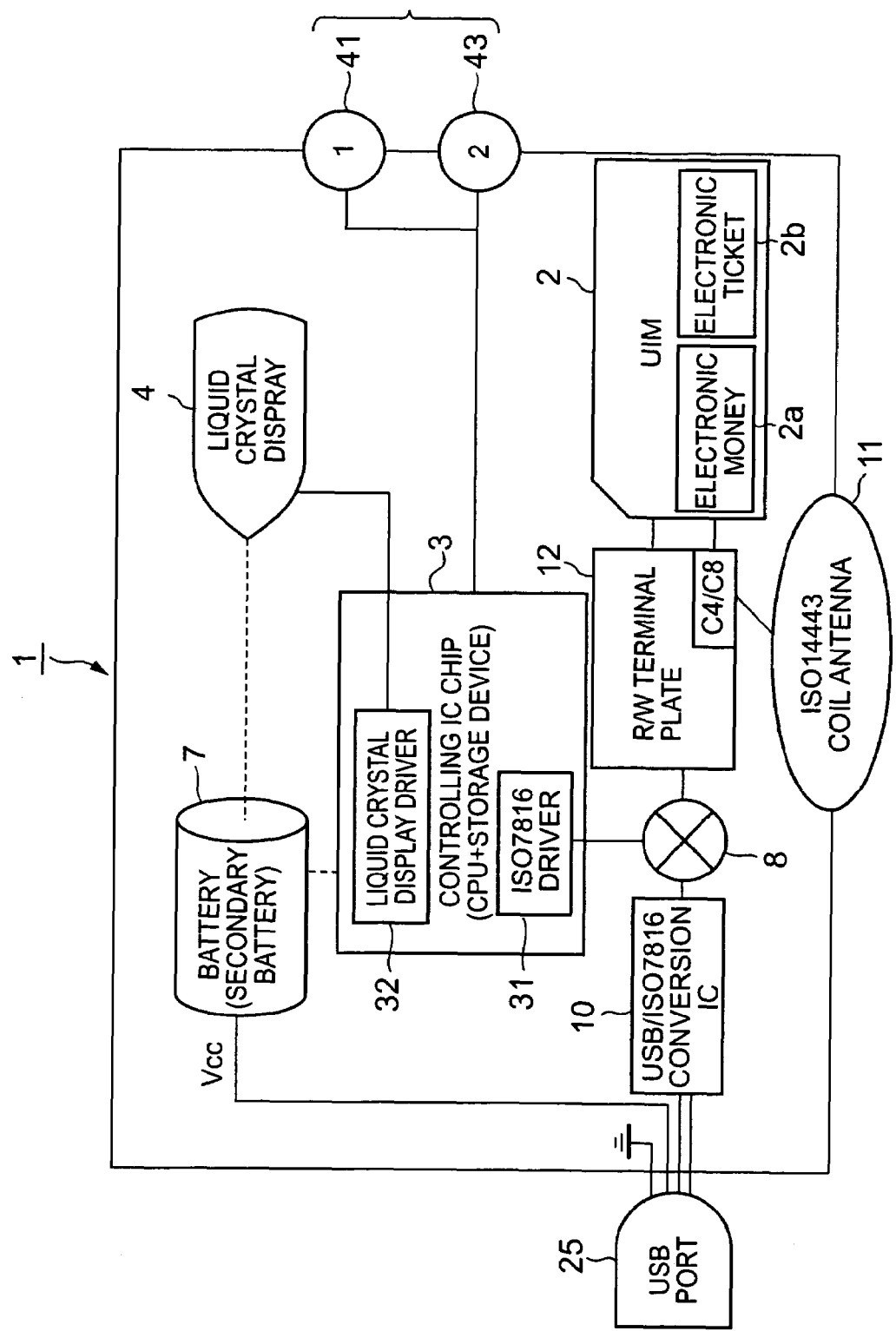
FIG. 29 is a block diagram of a UIM reader/writer in a fifth embodiment according to the present invention.
Figures 30, 31:
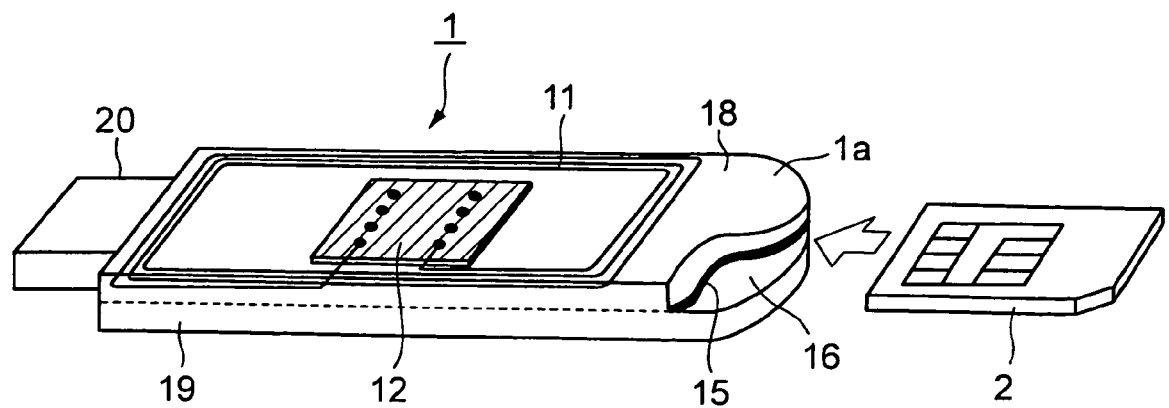
FIG. 30 is a perspective view showing the interior configuration of the UIM reader/writer in the fifth embodiment.
FIG. 31 is a plan view of the UIM reader/writer in the fifth embodiment.
Figure 32:
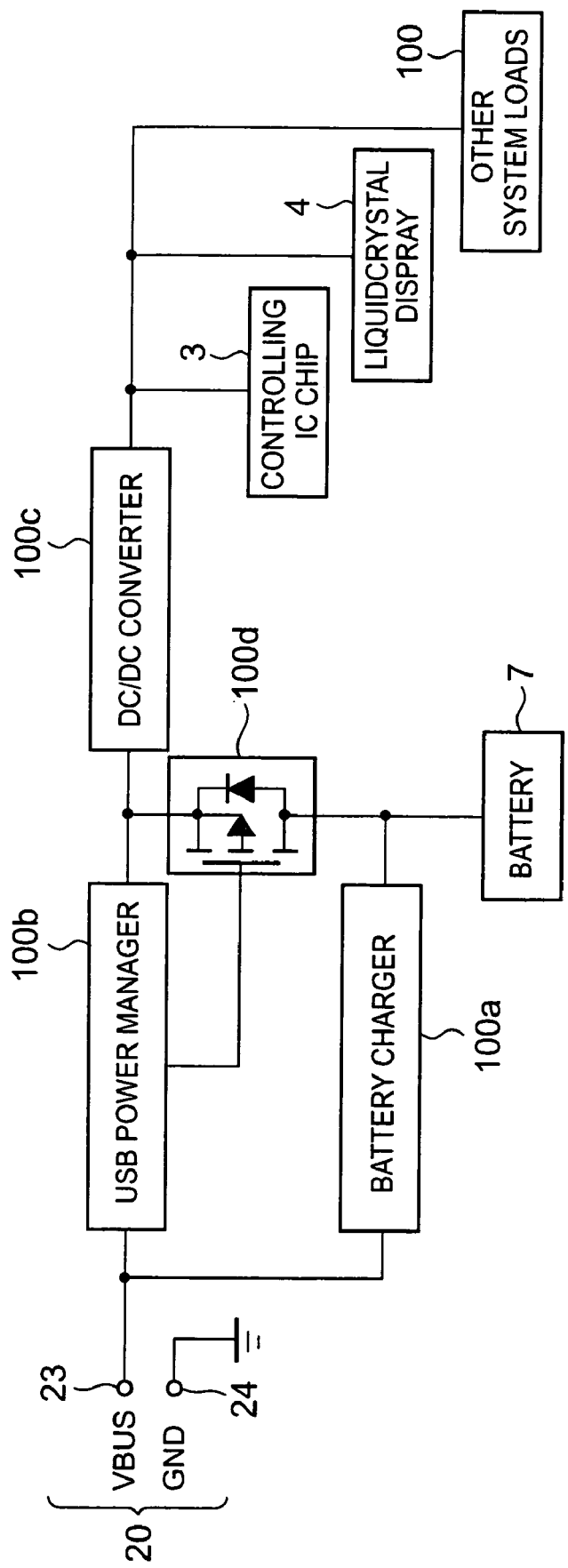
FIG. 32 is a block diagram of a control circuit included in a secondary battery charging/discharging unit.

FIG. 29 is a block diagram of the SIM R/W, FIG. 30 is a perspective view showing the interior configuration of the SIM R/W, FIG. 31 is a plan view of the SIM R/W and FIG. 32 is a block diagram of a control circuit included in a secondary battery charging/discharging unit.

As shown in FIG. 29, the UIM 2 can be removably inserted into the SIM R/W 1 of the present invention. The SIM R/W 1 includes the case 1a, the liquid crystal display 4 (FIG. 34) attached to the case 1a, a controlling IC chip 3 placed in the case 1a, a coil antenna 11 placed in the case 1a and a terminal plate 12 placed in the case 1a. The controlling IC chip 3 is provided with a CPU, a storage device, an ISO7816 driver 31 and a liquid crystal driver 32 for driving the liquid crystal display 4. Those components do not necessarily need to be integrated in the IC chip.

A signal emitted by the UIM 2 is sent through the R/W terminal plate 12 of the UIM R/W 1 and a relay 8 to the IC chip 3. A signal received from a USB port 25 by the USB connector 20 is sent through a USB/ISO7816 conversion IC 10 and the relay 8 to the controlling IC chip 10.

The R/W terminal plate 12 has terminals that can be connected to the eight terminals of the contact terminal plate of the UIM 2. The coil antenna 11 placed in the case 1a of the UIM R/W 1 is connected to terminals C4 and C8, namely, reserve terminals, of the contact terminal plate of the UIM 2. The coil antenna 11 is used for noncontact communication conforming to ISO 14443.

The UIM R/W 1 is provided with a battery (secondary battery) 7 as a power supply for driving the liquid crystal display 4 and the controlling IC chip 3. The battery 7 is placed in the case 1a. Preferably, the battery 7 is a lithium ion battery or a lithium polymer battery.

The switch buttons 41 and 43 are operated to close or open the power switch and to select a desired displayed function and a desired operation.

The USB connector 20 shown in FIG. 30 is connected to the USB port 25. The USB connector 20 is provided with two data pins D+ and D−, two power pins and a grounding pin. The two data pins D+ and D− are connected to the USB/ISO7816 conversion IC chip 10. The power pins are connected to the battery 7 to charge the battery 7 by bus power. The grounding pin is connected to a ground.

The liquid crystal display 4 displays pieces of information held by the IC chip of the UIM 2 successively when the switch button 43 is operated.

The liquid crystal display 4 may be a reflection color liquid crystal display capable of displaying color images by a dot matrix system. The liquid crystal display 4 is capable of graphic display. The liquid crystal display 4 has a thickness between about 1.0 and about 1.5 mm. The liquid crystal display 4 has a screen of a width between 20 and 30 mm and a length between about 40 and about 70 mm.

FIGS. 30 and 31 show the internal configuration of the SIM R/W 1. The relation between the R/W terminal plate 12 and the coil antenna 11 disposed behind the liquid crystal display 4 is shown in FIGS. 30 and 31.

As shown in FIGS. 30 and 31, the coil antenna 11 is formed on a peripheral part of the inside surface of the cover member 18 of the case 1a or on a peripheral part of the inside surface of the case member 19 of the case 1a. The opposite ends of the coil antenna 11 are connected to the terminals C4 and C8 of the R/W terminal plate 12, respectively. The UIM 2 is inserted into the UIM R/W 1 from the right side, as viewed in FIG. 30. The UIM 2 is held fixedly in a space under the R/W terminal plate 12 as shown in FIG. 31.

Wiring lines connected to the USB connector 20 are omitted in FIGS. 30 and 31. The terminals C5 (GND), C1 ($V_{cc}$), C2 (RST) and C7 (I/O) are connected to the USB/ISO7816 conversion IC 10. The two data pins D+ and D−, the two power pins and the grounding pin are connected to the USB connector 20.

A conventional SIM is provided with an IC chip having the USB function, and the USB(D+) and the USB(D−) use the terminals C4 and C8, respectively. Since the UIM R/W 1 of the present invention employs the USB/ISO7816 conversion IC 10, a dual IC module having a conventional function can be used. Since the coil antenna 11 is connected to the terminals C4 and C8, the SIM 2 and the R/W do not need to use a special terminal plate provided with eight or more terminals.

Power is supplied through the USB connector 20 attached to the case 1a to the secondary battery 7 to charge the secondary battery 7. USB standards specify that a USB cable transmits data in opposite directions and transmits power in a single direction. The present invention does not use a cable for charging and uses a connector of a complementary shape defining upper and lower end parts for charging. A USB can carry power of 5 V±5% dc and 500 mA. USB standards prescribe that a device connected to a USB may be provided with a power supply. Such a device is called a built-in power supply type device. An upper device or a device reliant on only the power supplied through a hub is called a bus power supply type device. Thus the UIM R/W of the present invention is a built-in power supply type device.

FIG. 32 is a block diagram of a control circuit included in a secondary battery charging/discharging unit combined with the battery 7.

The USB connector 20 has a power pin ($V_{bus}$) 23 and a grounding pin 24. The grounding pin 24 is connected to a wiring board, not shown, or the like for grounding. A power supply line connected to the power pin 23 is connected to a USB power manager 110b meeting USB standards for bus power supply, such as USB Power Manager LTC4410ES6 (Linear Technology) and to, a battery charger 100a meeting charging conditions for charging the battery 7, such as Battery Charger LTC4053EMSE-4.2 (Linear Technology).

When the USB connector 20 is connected to the USB terminal of a PC or the like, the USB power manager 100b measures the potential of the power pin 23 and disconnects the source and the drain of a p-type FET 100d, such as FET TPCS8302 (Toshiba). Consequently, power supplied through the power pin 23 is supplied through the battery charger 100a to the battery 7 to charge the battery 7, and is supplied through the USB power manager 100b and a dc/dc converter 100c to the controlling IC chip 3, the liquid crystal display 4 and other system loads 100.

Parts capable of being driven by low voltages have been prevalently used to meet conditions for the recent trend toward low power consumption. Therefore, the supply voltage standard of 5 V for the USB is excessively high. The dc/dc converter 100c reduces the input supply voltage to a system supply voltage of 3.3 V for the UIM R/W 1. The battery charger 100a is set for a maximum IC charging. The combination of the function of the battery charger 100a and the power supply limiting function of the USB power manager 100a meets USB standards for bus power supply.

When the USB connector 20 is not connected to the USB terminal of the PC or the like, the battery charger 100a impedes power supply in a direction reverse to a direction in which power is supplied to charge the battery 7 and the source and the drain of the p-type FET 100d are electrically connected. Consequently, the power of the battery 7 is supplied through the dc/dc converter 100c to the controlling IC chip 3, the liquid crystal display 4 and the other system loads 100.

Figure 33:
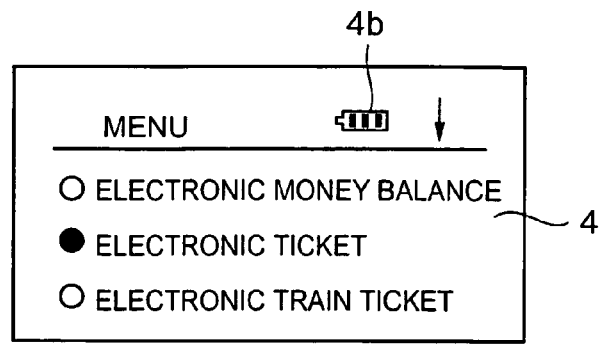
FIG. 33 is a pictorial view of an image displayed by a liquid crystal display.

FIG. 33 shows a picture displayed by the liquid crystal display 4 by way of example. Shown in FIG. 33 is a menu selection picture including items "Electronic money balance", "Electronic ticket" and "Electronic ticket". One of those items can be selected.

A residual capacity indicating icon 4b having the shape of a dry battery and indicating the remaining capacity of the battery 7 is displayed in an upper part of the screen of the liquid crystal display 4. Rectangles in the residual capacity indicating icon 4b represent the residual capacity. Charging can be prompted by making the rectangles of the residual capacity indicating icon 4b flicker when the residual capacity of the battery 7 decreases below a threshold capacity. The residual capacity indicating icon 4b can indicate the progress of charging.

EXAMPLE

A UIM R/W 1 was provided with a liquid crystal display 4 of 30 mm×40 mm in size capable of displaying four lines each of ten Zenkaku characters (Nippon Itagarasu K.K) operating on a current of 0.3 mA. A CISC Maikon (Runesasu) operating on a current of 40 mA was used as a controlling IC chip 3. A lithium ion secondary battery of 150 mA-h capacity (Hitachi Maxell) of 6 mm in thickness was used as a battery 7. When power was supplied from the fully charged battery 7 and the liquid crystal display 4 was kept displaying a picture for about one hour, a warning indicating the drop of the residual capacity of the battery 7 below a threshold capacity was displayed. The battery 7 could be fully charge by connecting a USB connector to a PC and applying a supply voltage of 5 V for about 30 min.

The UIM R/W of the present invention provided with the liquid crystal display can be used for authenticating access privilege to gain access to a PC. Since the UIM R/W has a noncontact communication conforming to ISO 14443, the UIM R/W can be used as an electronic ticket and as electronic money for noncontact transactions, such as electronic account settlement. Since the UIM R/W of the present invention is provided with the charging system for charging the battery 7 by power supplied from a USB bus, the UIM R/W connected to a PC can use power supplied from the PC for driving the liquid crystal display when necessary. The UIM R/W of the present invention not use any ac adapter facilitates carrying the UIM R/W, and the omission of an ac adapter is effective in reducing the cost.

Sixth Embodiment

A portable device in a sixth embodiment according to the present invention will be described with reference to the accompanying drawings. The portable device in the sixth embodiment is practiced in four different types of portable devices respectively provided with different noncontact communication inhibiting means.

Figure 35:
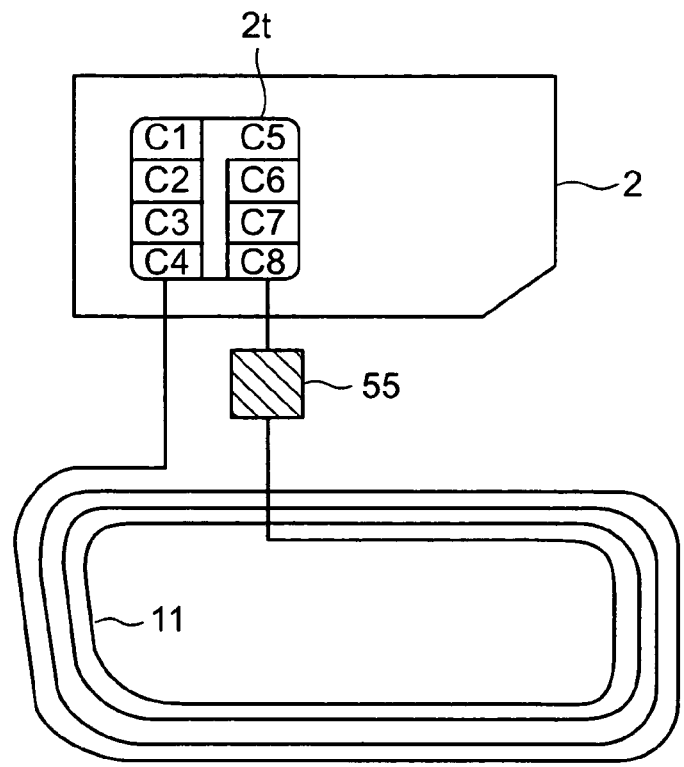
FIG. 35 is a plan view of a portable device in Example 6-1 of a portable device in a sixth embodiment according to the present invention.
Figure 36:
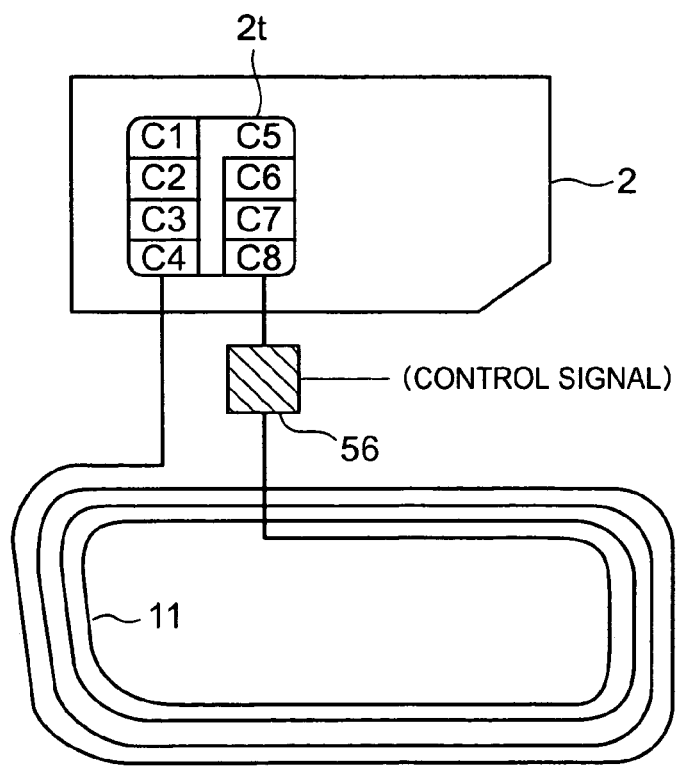
FIG. 36 is a plan view of a portable device in Example 6-2 of the portable device in the sixth embodiment.
Figure 37:
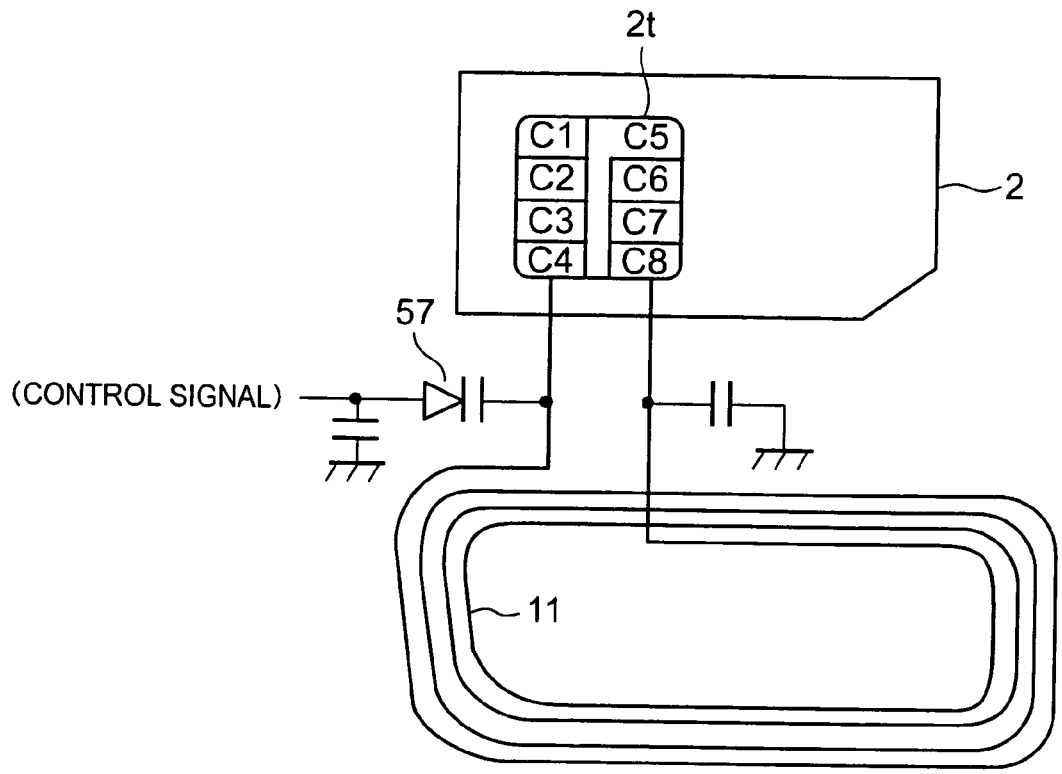
FIG. 37 is a plan view of a portable device in Example 6-3 of the portable device in the sixth embodiment.
Figure 38:
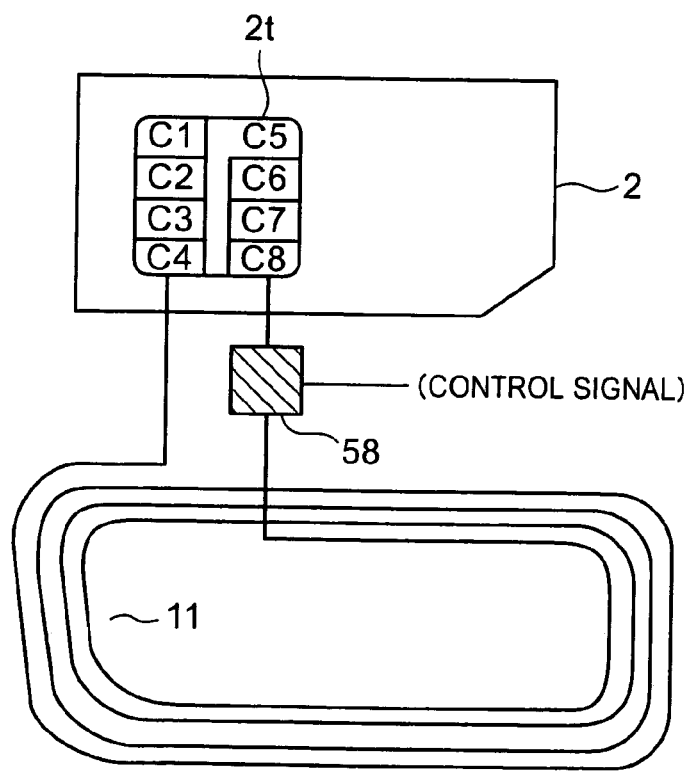
FIG. 38 is a plan view of a portable device in Example 6-4 of the portable device in the sixth embodiment.
Figure 39:
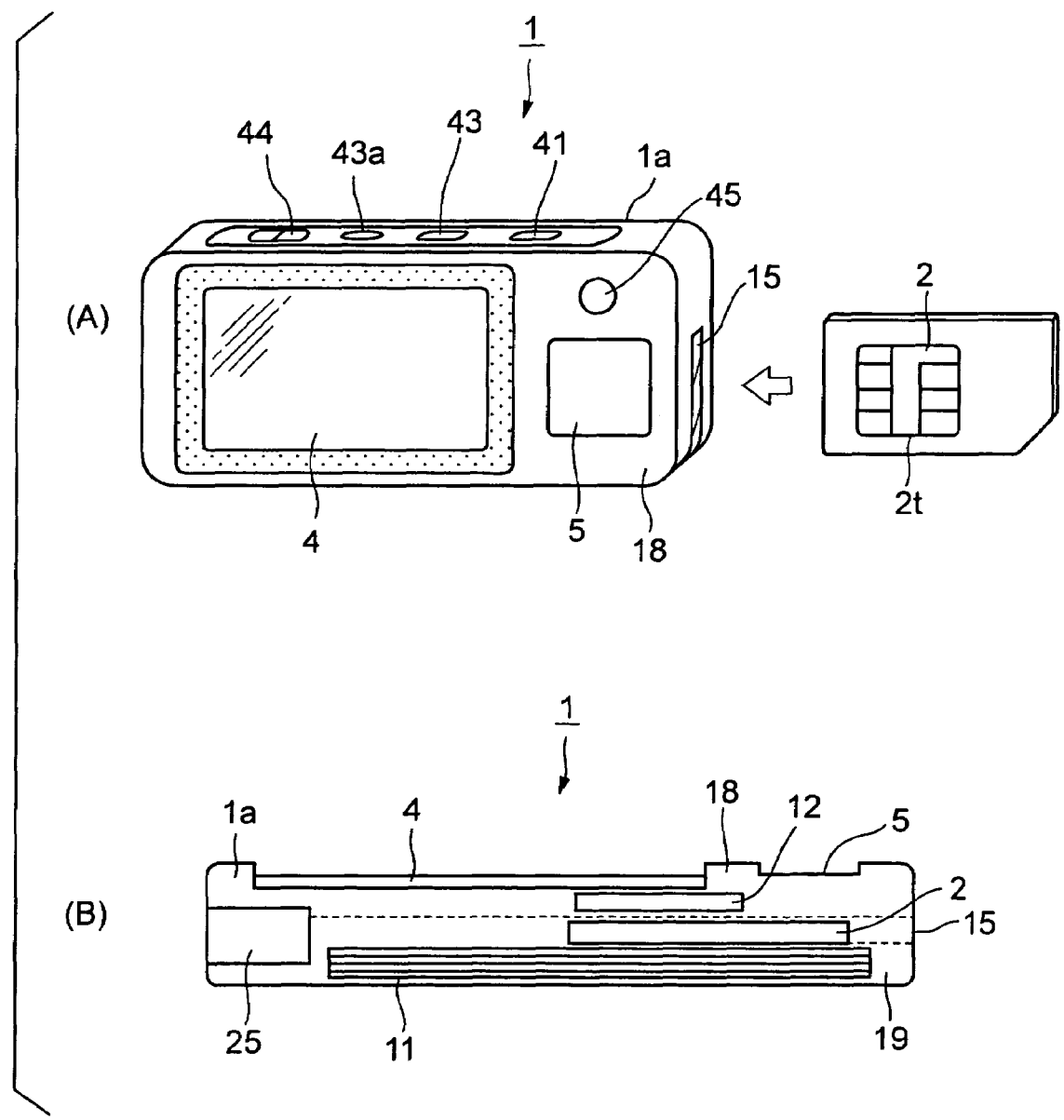
FIG. 39 is a perspective view of a portable device.
Figure 40:
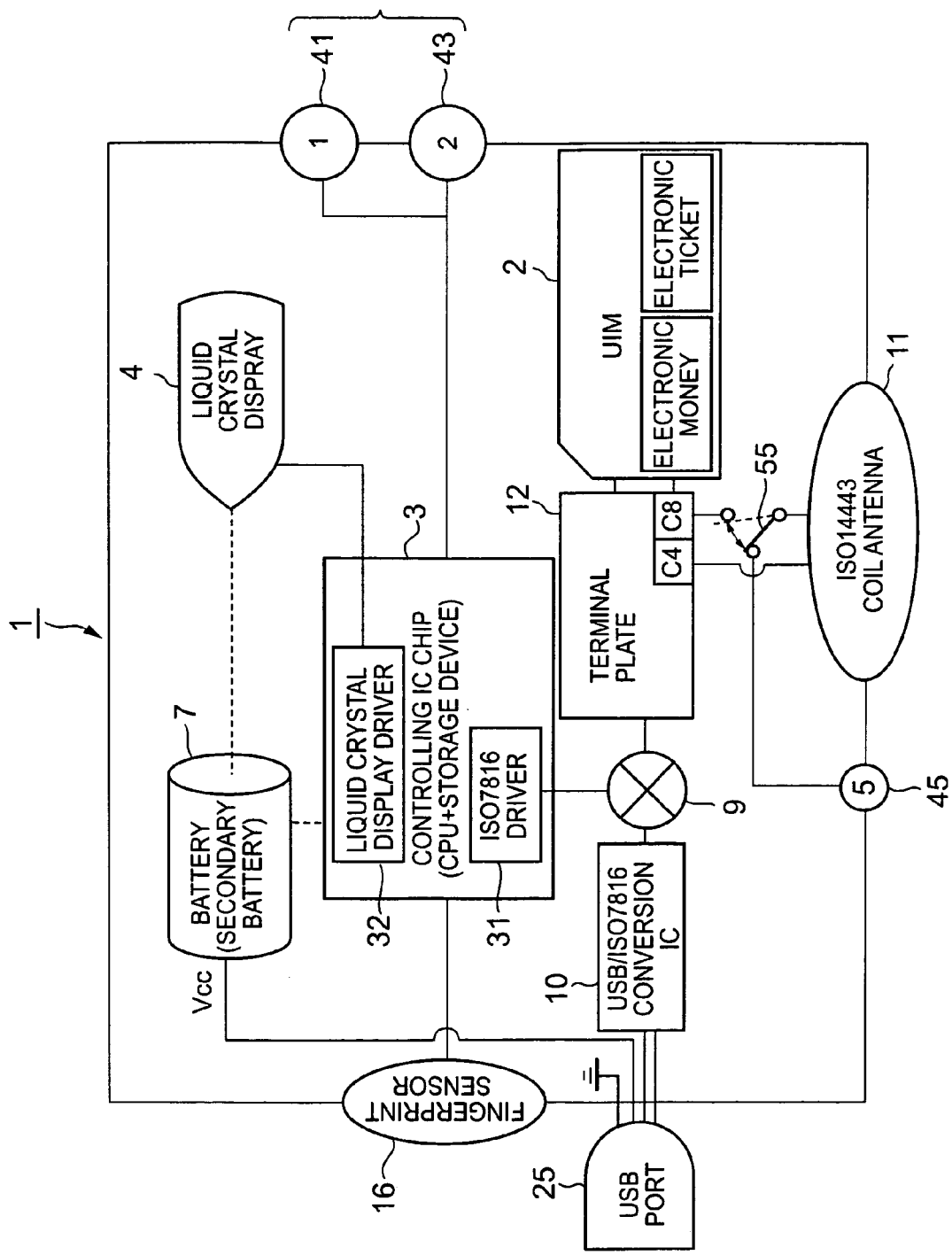
FIG. 40 is a block diagram of the portable device in Example 6-1.
Figure 41:
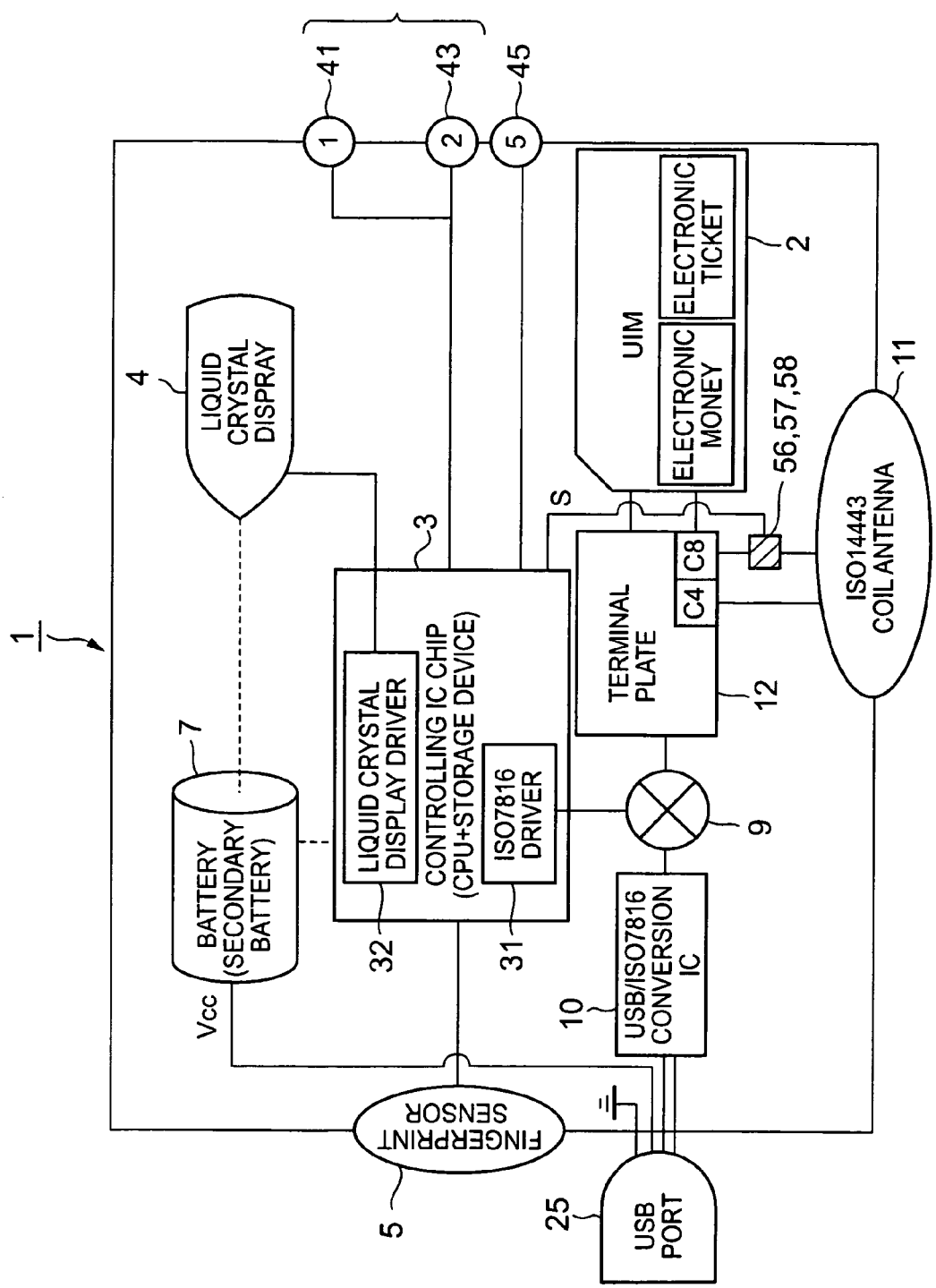
FIG. 41 is a block diagram of the portable devices in Example 6-2, 6-3 and 6-4.

FIG. 35 is a plan view of a portable device in Example 6-1 of the portable device in the sixth embodiment, FIG. 36 is a plan view of a portable device in Example 6-2 of the portable device in the sixth embodiment, FIG. 37 is a plan view of a portable device in Example 6-3 of the portable device in the sixth embodiment, FIG. 38 is a plan view of a portable device in Example 6-4 of the portable device in the sixth embodiment, FIG. 39 is a perspective view of a portable device, FIG. 40 is a block diagram of the portable device in Example 6-1, and FIG. 41 is a block diagram of the portable devices in Example 6-2, 6-3 and 6-4.

A portable device (referred to sometimes as "SIM R/W) 1 in the sixth embodiment according to the present invention can be loaded with a UIM (referred to sometimes as "SIM") 2. The portable device 1 has a case 1a, a terminal plate 12 placed in the case 1a so as to be connected to the UIM (SIM) 2, a coil antenna 11 placed in the case 1a and connected to the terminal plate 12 and a controlling IC chip placed in the case 1a. A liquid crystal sensor 4 and a fingerprint sensor 5 are embedded in the outside surface of the case 1a as shown in FIG. 39.

In a portable device 1 in Example 6-1 of the portable device 1 in the sixth embodiment, a switching circuit 55 is placed between the coil antenna 11 and the terminal C8 (or the terminal C4) of a contact terminal plate 2t of a UIM 2 in the case 1a as shown in FIG. 35. The switching circuit 55 is turned on and off by operating an antenna control switch 45 (FIG. 40). The antenna control switch 45 may be either a mechanical switch or an electromagnetic switch. The antenna control switch 45 and the switching circuit 55 constitute a noncontact communication inhibiting means.

The contact terminal plate 2t is included in a contact IC card or a UIM 2 and has eight terminals including terminals C1 ($V_{cc}$), C2 (RST), C3 (CLK), C5 (GND), C6 ($V_{pp}$) and C7 (I/O). Pads of an IC chip attached t the back surface of the contact terminal plate 2t are connected through through holes or the like to the terminals of the contact terminal plates 2t.

The contact terminal plate 2t is provided with terminals C4 and C8, which are RFU (reserved for future use) terminals not used by the contact type. A noncontact communication circuit included in the IC chip is connected to the terminals C4 and C8. The coil antenna 11 of the portable device 1 is connected to the terminals C4 and C8 by contact pins.

The mechanical switch 45 of the portable device 1 in Example 6-1 may be a slide switch or a push switch. More specifically, the mechanical switch 45 is a switch that can be easily operated by a fingertip, such as a slide switch of the SSAD Series (Alps Electric) or a push switch of the SPPJ6 Series (Alps Electric). When the mechanical switch 45 is a slide switch, the mechanical switch 45 is operated to select either a noncontact communication enabling state or a noncontact communication disabling state. When the mechanical switch 45 is a push switch, a noncontact communication enabling state is set only while the push button of the mechanical switch 45 is depressed.

Referring to FIG. 36 showing a portable device 1 in Example 6-2, a relay 56 is placed between a coil antenna 11 and the terminal C8 (or the terminal C4) of a contact terminal plate 2t of a UIM 2.

More specifically, the relay 56 may be, for example, a photoelectric relay (TPL172, Toshiba) having a low on-state resistance; a general relay or a solid-state relay.

The relay is a device that opens or closes a circuit when current, voltage or power increases beyond or decreases below a predetermined threshold level. The photoelectric relay includes three devices, namely, a light-emitting device, such as a LED, a light-receiving device, such as a photodiode, and a MOSFET. The light-receiving device receives light emitted by the light-emitting device and coverts the intensity of the light into a corresponding voltage. The voltage is used as a gate voltage to drive the MOSFET. Since an electric signal produced by thus converting a light signal is used, the input and the output side do not need to be electrically insulated and any contacts subject to wear are not necessary.

The solid state relay is a contactless relay consisting of semiconductor devices and is featured by high-speed control performance and high durability.

Since the portable device 1 shown in FIG. 36 is operated electrically instead of mechanically, the circuit can be automatically closed or opened according to a control program.

As shown in FIG. 36, the relay 56 is controlled by control signals. The switch button of the antenna control switch 45 of the portable device 1 is operated to close or open the relay 56 by, for example, a CPU.

Referring to FIG. 37 showing a portable device 1 in Example 6-3, a variable-capacitance diode 57 is connected to a line connecting a coil antenna 11 to the terminal C4 (or the terminal C8) of a contact terminal plate 2t included in a UIM 2, and a line connecting the coil antenna 11 to the terminal C8 is grounded. More concretely, the variable-capacitance diode 57 may be a variable-capacitance diode (MA2S374) available from Matsushita Denki Sangyo.

The capacitance of the variable-capacity diode 57 is changed by changing voltage applied to the variable-capacity diode 57. Thus noncontact communication can be enabled or disabled by changing the resonance frequency of the coil antenna 11. Thus the fine adjustment of the resonance frequency to match the resonance frequency with the characteristic of the portable device 1 can be achieved without changing component parts.

When a switch button for operating an antenna control switch 45 is operated, a control signal for controlling the variable-capacity diode 57 can be turned on and off by, for example, a CPU.

Referring to FIG. 38 showing a portable device 1 in Example 6-4, a digital potentiometer (or a variable resistor) 58 is placed in a line connecting a coil antenna 11 to the terminal C8 of a contact terminal plate 2t included in a UIM 2. The portable device 1 in Example 6-4 employs, for example, a digital potentiometer (MAS5491) available from MAXI.

The resistance of the digital potentiometer (or the variable resistor) 58 is changed by a control signal to enable or disable noncontact communication by changing the Q of the coil antenna 11. The Q is a value indicating the sharpness of resonance of a resonance circuit.

When a switch button for operating an antenna control switch 45 is operated, a control signal for controlling the digital potentiometer 58 can be turned on and off by, for example, a CPU.

Although the control signal provided by the CPU to control the relay or the like is set on or off by the signal provided by operating the switch n the potable devices 1 in Examples 6-2, 6-3 and 6-4, a control signal provided by operating the switch 45 may be directly given to the circuit. It is readily known that the use of the CPU for controlling the circuit is not an absolutely necessary condition.

The general constitution of the portable device 1 will be described.

Referring to FIG. 39, the portable device 1 has a case 1a, a liquid crystal display 4 attached to the case 1a, a fingerprint sensor 5 and a USB female connector 25. FIG. 39(A) is a perspective view of the portable device 1 and FIG. 39(B) is a sectional view of the portable device 1 loaded with a UIM 2.

Referring to FIG. 39(A), an insertion opening 15 is formed in a right end part of the case 1a of the portable device 1. The UIM 2 can be removably inserted through the insertion opening 15 into the portable device 1. The liquid crystal display 4 is embedded in the outside surface of the portable device 1 to display pieces of information held by the UIM 2.

A PC or the like can be connected by a USB cable to the USB female connector 25 disposed in a left end part of the case 1a. A USB male connector projecting from the case 1a may be used instead of the USB female connector 25.

The fingerprint sensor 5 placed on the case 1a may be used for authenticating access privilege to gain access to a PC or the like when the portable device 1 is connected to the PC or the like.

Switch buttons 41, 43 and 43a are arranged on a side surface of the portable device 1. The switch button 41 is operated to close or open a power switch for controlling a power supply. The switch buttons 43 and 43a are operated to select a desired displayed function and a desired operation. A power source slide switch 44 is operated to lock the power supply in a desired state. An antenna switch button 45 is placed on a cover member 18 of the case 1a of the portable device 1. The antenna switch button 45 is operated to operate a noncontact communication inhibiting means of the present invention.

The power supply slide switch 44 and the switch buttons 41, 43 and 43a may be properly arranged so as to match the constitution and design of the portable device 1.

As shown in FIG. 39(B) in a sectional view, the UIM 2 is inserted into the portable device 1 from the right side, as viewed in FIG. 39(B) and is held fixedly in a space under a UIM terminal plate 12 to be connected to the UIM 2.

Usually, the case 1a of the portable device 1 has the cover member 18 and a case member 19. The UIM terminal plate 12, a coil antenna 11 and a battery, not shown, are placed in the case 1a.

The coil antenna 11 is connected through the UIM terminal plate 12 to the terminals C4 and C8 of a contact terminal plate 2t included in the UIM 2. The USB female connector 25 is disposed in the left end part of the case 1a.

The UIM terminal plate 12 is connected to the eight terminals of the contact terminal plate 2t of the UIM 2 by contact pins, not shown. The coil antenna 11 placed in the case 1a is connected to the terminals C4 and C8, namely, reserve terminals. A noncontact communication inhibiting means is incorporated into a circuit connecting the coil antenna 11 to the terminal C4 or C8 of the terminal plate 12.

The coil antenna 11 is used for noncontact communication conforming to ISO 14443. Noncontact communication can be achieved by using the coil antenna 11 even if the UIM 2 is not provided with any coil antenna.

FIG. 40 is a block diagram of the portable device 1 in Example 6-1.

As shown in FIG. 40, the portable device 1 is provided with a controlling IC chip 3 for controlling the general operations of the portable device 1. The controlling IC chip 3 has a CPU, a storage device, an ISO7816 driver 31 and a liquid crystal display drive r 32 (or a fingerprint sensor driver, not shown).

A signal provided by the UIM 2 is sent through the UIM terminal plate 12 and a relay 9 to the controlling IC chip 3. The UIM 2 shown in FIG. 40 holds electronic money and an electronic ticket as applications. Practically, the UIM 2 may hold various applications other than the electronic money and the electronic ticket.

Although the coil antenna 11 may be placed on a peripheral part of the cover member 18 or the case member 19, it is preferable to place the coil antenna 11 in the case member 19 opposite to the liquid crystal display 4 to enhance the ability of the coil antenna 11 for noncontact communication with an external device. The USB female connector 25 disposed in a left end part of the case 1a. The coil antenna 11 is formed by coiling a covered copper wire having a diameter on the order of 0.3 mm. The coil antenna 11 may have eight turns of the copper wire.

The noncontact communication inhibiting means is connected to a line connecting the coil antenna 11 to the terminal C4 or C8 of the terminal plate 12. In the portable device 1 in Example 6-1 shown in FIG. 40, a switching circuit 55 is placed in a line connecting the coil antenna 11 to the terminal C8 of the terminal plate 12. When the switching circuit 55 is a mechanical switch, an antenna control switch button 45 is combined with the switching circuit 55.

FIG. 41 is a block diagram of the portable device 1 in Example 6-2, 6-3 or 6-4. In this portable device 1, a control signal S provided by a CPU included in a controlling IC chip 3 is sent to a relay, a photoelectric relay, a solid state relay 56, a variable-capacity diode 57, a digital potentiometer and a variable resistor 58. An antenna control switch button 45 is operated to make the controlling IC chip 3 send out the control signal S or stop sending out the control signal S.

A switch operated by the antenna control switch button 45 is not limited to a mechanical switch and may be any type of a switch, provided that the switch is able to make the controlling IC chip 3 send out the control signal S or stop sending out the control signal S when the antenna control switch button 45 is depressed.

The relay, the photoelectric relay, the solid state relay 56, the variable-capacity diode 57, the digital potentiometer and the variable resistor 58 are placed between the coil antenna 11 and the terminal C4 or C8 of the terminal plate 12.

The constitution of the portable device 1 shown in FIG. 40 and the following constitution are common to all the examples.

Placed in the case 1a of the portable device 1a is a battery (secondary battery) 7 as a power supply for driving the liquid crystal display 4 and the controlling IC chip 3. Preferably, the battery 7 is a lithium ion battery or a lithium polymer battery. The lithium secondary battery is capable of supplying power of a voltage between about 3.3 and about 3.5 v and hence the lithium secondary battery can surely supplying power necessary for driving the controlling IC chip 3.

When the portable device 1 is provided with a USB female connector 25 or a USB make connector, the USB female connector 25 or the USB male connector of the portable device 1 can be connected the USB port of a PC or the like.

A USB cable is provided with two data pins D+ and D−, a power pin and a grounding pin. The two data pins are connected to a USB/ISO7816 conversion IC chip 10. Signals applied to the data pins are transmitted through the USB/ISO7816 conversion IC chip 10 and the relay 9 to the controlling IC chip 3. Bus power is supplied through the power pin.

When the USB female connector 25 or the USB male connector is connected to the PC or the like, driving power can be supplied by the PC or the like. The bus power may be used for charging the battery 7.

The size of the liquid crystal display may be about 25 mm×about 40 mm and the thickness of the liquid crystal display 4 may be between about 1.0 and about 1.5 mm. The liquid crystal display 4 needs a driving current on the order of 0.3 mA to display four lines each of ten Zenkaku characters. Preferably, the fingerprint sensor 5 is an electrostatic condenser type fingerprint sensor. The fingerprint sensor 5 may be either of a flat type fingerprint sensor against which the fingertip is pressed and a sweep type fingerprint sensor having a surface to be rubbed with the fingertip. It is desirable to form the SIM R/W 1 in a small size when the fingerprint sensor 5 is of the sweep type because the sweep type fingerprint sensor has a small area.

Preferably, the fingerprint sensor 5 is an electrostatic condenser type fingerprint sensor. The flat type fingerprint sensor 5 provides an electric signal representing the arrangement of irregularities in a fingertip. The flat type fingerprint sensor 5 is provided with many sensor circuits capable of generating electric signals representing irregularities in a fingertip. When a fingertip is pressed against the flat type fingerprint sensor 5, the fingerprint sensor 5 reads a fingerprint. The sweep type fingerprint sensor 5 has a sensing surface of a width of several millimeters. When the sensing surface is rubbed with a fingertip, the sweep type fingerprint sensor 5 is able to recognize the features of a fingerprint. The sweep type fingerprint sensor is preferable to form the portable device in a small size.

The case 1a of the portable device 1 has a cover member 18 and a case member 19. The cover member 18 and the case member 19 are formed of a polycarbonate resin or the like by injection molding.

The case 1a of the portable device 1 provided with the liquid crystal display 4 has a width between 30 and 40 mm, a length between 40 and 80 mm and a thickness between about 8 and abut 20 mm.

The portable device of the present invention is provided with the noncontact communication inhibiting means placed in the circuit connecting the coil antenna to the UIM. Therefore, UIM is unable to operate for noncontact communication unless the user performs an operation intentionally to make the noncontact communication inhibiting means ineffective. Since unintended transactions and unintended account settlement are not carried out carelessly and hence trouble to cancel unintended transactions can be saved.

The noncontact communication inhibiting means can be easily turned on and off by any person by simply operating a switch.

The invention claimed is:

1. A SIM reader/writer, capable of being removably loaded with a SIM, comprising:
    a case;
    a terminal plate placed in the case so as to be connected to the SIM;
    a coil antenna placed in the case and connected to the terminal plate;
    a controlling IC chip placed in the case and connected to the terminal plate; and
    a display embedded on an outside surface of the case and controlled by the controlling IC chip, wherein
    a USB connector is placed in the case, and an IC chip having a USB/contact type IC card communication interface converting function and connected to the USB connector, is placed in the case.

2. The SIM reader/writer according to claim 1, wherein a fingerprint sensor is placed in the case and connected to the controlling IC chip.

3. The SIM reader/writer according to claim 1, wherein a short-distance communication means is placed in the case and connected to the controlling IC chip.

4. The SIM reader/writer according to claim 3, wherein the short-distance communication means is of a Bluetooth system.

5. The SIM reader/writer according to claim 1, wherein the SIM has contact and noncontact interfaces.

6. The SIM reader/writer according to claim 1, wherein the SIM can be loaded with multiple applications.

7. The SIM reader/writer according to claim 1, wherein an infrared communication means connected to the controlling IC chip is placed in the case.

8. The SIM reader/writer according to claim 1, wherein a cushiony member is attached to a surface of the case, opposite the surface provided with the display.

9. The SIM reader/writer according to claim 8, wherein the cushiony member is made of rubber.

10. The SIM reader/writer according to claim 8, wherein the cushiony member is made of a polyurethane resin.

11. The SIM reader/writer according to claim 8, wherein the display is a liquid crystal display.

12. The SIM reader/writer according to claim 1, wherein a secondary battery for driving the display is placed in the case, and the secondary battery can be charged through a USB connector by an external power source.

13. The SIM reader/writer according to claim 12, wherein the secondary battery is a lithium ion battery.

14. A SIM reader/writer, capable of being removably loaded with a SIM, comprising:
    a case;
    a terminal plate placed in the case so as to be connected to the SIM;
    a coil antenna placed in the case and connected to the terminal plate;
    a controlling IC chip placed in the case and connected to the terminal plate; and
    a display embedded on an outside surface of the case and controlled by the controlling IC chip, wherein
    a wiring board holding the terminal plate is placed in the case and 50% or above of the overall length of the coil antenna does not overlap the wiring board in a plane, and
    a USB connector is placed in the case, and an IC chip having a USB/contact type IC card communication interface converting function and connected to the USB connector is placed in the case.

15. The SIM reader/writer according to claim 14, wherein the width of a space between the inner side of a part of the coil antenna not overlapping the wiring board in a plane and the outer side of the wiring board is in the range of 0.5 to 3.0 mm.

16. The SIM reader/writer according to claim 14, wherein the gap between a plane containing the coil antenna and a plane containing the wiring board has a size in the range of 0.5 to 3.0 mm.

17. A SIM reader/writer, capable of being removably loaded with a SIM, comprising:
    a case;
    a terminal plate placed in the case so as to be connected to the SIM;
    a coil antenna placed in the case and connected to the terminal plate;
    a controlling IC chip placed in the case and connected to the terminal plate; and
    a display embedded on an outside surface of the case and controlled by the controlling IC chip, wherein
    a noncontact communication inhibiting means is placed in the case.

18. The SIM reader/writer according to claim 17, wherein the noncontact communication inhibiting means is provided with a switching circuit interconnecting the terminal plate and the coil antenna.

19. The SIM reader/writer according to claim 18, wherein the switching circuit is operated by a mechanical switch.

20. The SIM reader/writer according to claim 19, wherein the mechanical switch is a push switch, and noncontact communication is possible while the push switch is closed.

21. The SIM reader/writer according to claim 19, wherein the mechanical switch is a slide switch, and a noncontact communication mode is set alternately in an on state and an off state every time the slide switch is operated.

22. The SIM reader/writer according to claim 17, wherein the noncontact communication inhibiting means includes a relay, a photorelay or a solid-state relay.

23. The SIM reader/writer according to claim 17, wherein the noncontact communication inhibiting means is provided with a variable-capacitance diode for changing the resonance frequency of the coil antenna.

24. The SIM reader/writer according to claim 17, wherein the noncontact communication inhibiting means is provided with a digital potentiometer or a variable resistor for changing the Q of the coil antenna.

25. The SIM reader/writer according to claim 17, wherein a fingerprint sensor is placed in the case and connected to the controlling IC chip.

26. The SIM reader/writer according to claim 17, wherein a USB connector is placed in the case, and an IC chip having a USB/contact type IC card communication interface converting function, and connected to the USB connector, is placed in the case.

* * * * *